United States Patent
Sekiguchi et al.

(10) Patent No.: US 7,630,442 B2
(45) Date of Patent: Dec. 8, 2009

(54) PACKET GENERATING METHOD, VIDEO DECODING METHOD, MEDIA MULTIPLEXER, MEDIA DEMULTIPLEXER, MULTIMEDIA COMMUNICATION SYSTEM AND BIT STREAM CONVERTER

(75) Inventors: Shunichi Sekiguchi, Tokyo (JP); Fuminobu Ogawa, Tokyo (JP); Kohtaro Asai, Tokyo (JP); Yoshimi Isu, Tokyo (JP); Shinichi Kuroda, Tokyo (JP); Yuri Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 598 days.

(21) Appl. No.: 11/233,131

(22) Filed: Sep. 23, 2005

(65) Prior Publication Data

US 2006/0013321 A1 Jan. 19, 2006

Related U.S. Application Data

(62) Division of application No. 09/692,720, filed on Oct. 20, 2000, now Pat. No. 7,327,791.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.27

(58) Field of Classification Search ............ 375/240.16, 375/240.24, 240.25, 240.27
See application file for complete search history.

(56) References Cited

U.S. PATENT DOCUMENTS

| 5,801,781 | A | 9/1998 | Hiroshima et al. |
| 5,835,144 | A | 11/1998 | Matsumura et al. |
| 6,643,729 | B2 | 11/2003 | Sasaki et al. |
| 6,654,544 | B1 | 11/2003 | Suzuki et al. |
| 6,741,793 | B1 | 5/2004 | Sugiyama |
| 6,807,366 | B1 | 10/2004 | Okubo et al. |

FOREIGN PATENT DOCUMENTS

| EP | 0 861 001 A2 | 8/1998 |
| JP | 06-205384 A | 7/1994 |
| JP | 06 276509 | 9/1994 |
| JP | 7-107461 A | 4/1995 |
| JP | 07-143480 A | 6/1995 |
| JP | 8-88618 A | 4/1996 |
| JP | 09-191457 A | 7/1997 |
| JP | 10-056480 A | 2/1998 |
| JP | 10-234040 A | 9/1998 |

*Primary Examiner*—Nhon T Diep
(74) *Attorney, Agent, or Firm*—Birch, Stewart, Kolasch & Birch, LLP

(57) ABSTRACT

A moving image coded string is mapped with a set of information areas as one packet, and each packet is added with an error code and control information in a multiplexing part so that it is decided at the receiving side, from the result of error detection by decoding the error detection code, whether an error has occurred in each information area of the packet.

6 Claims, 24 Drawing Sheets

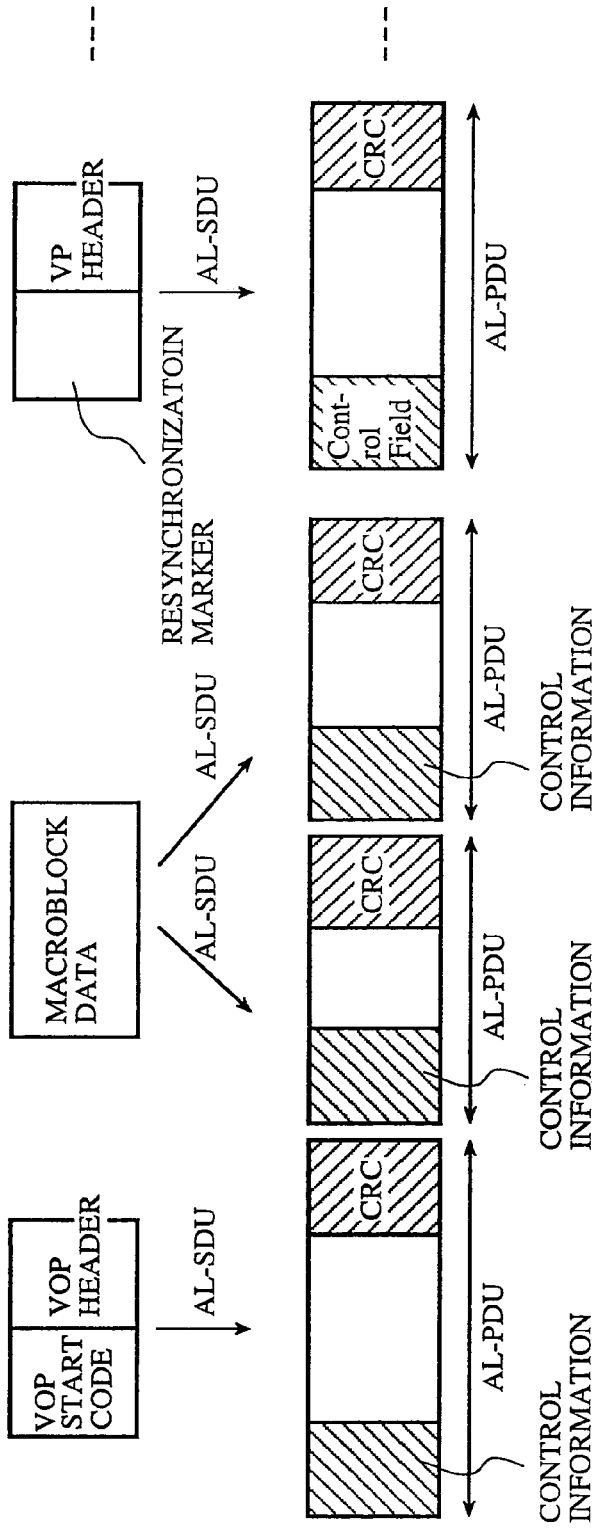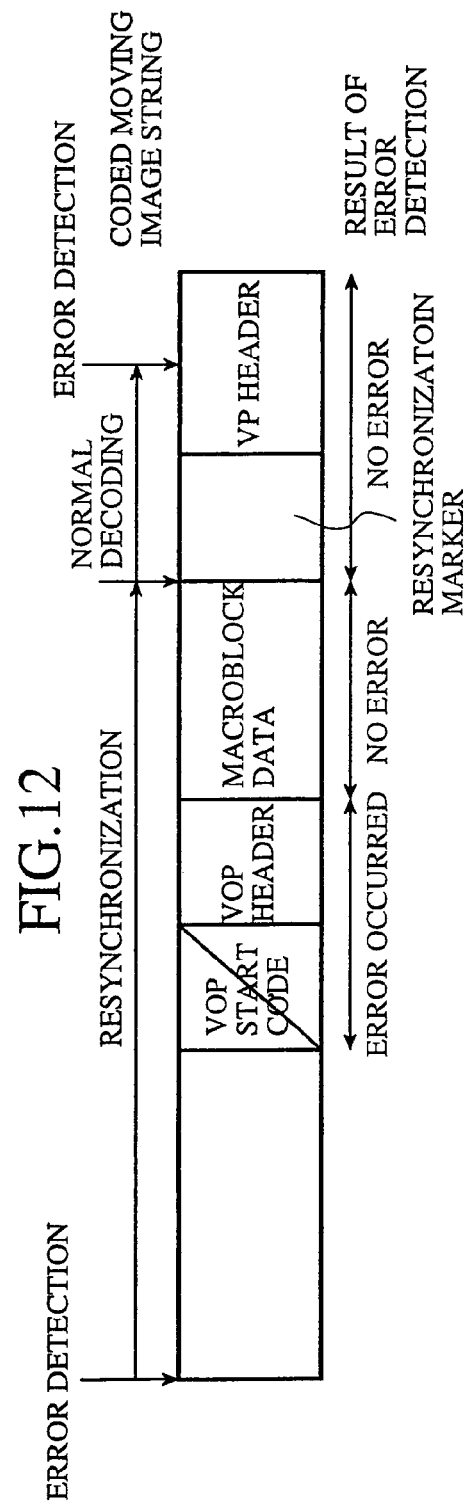

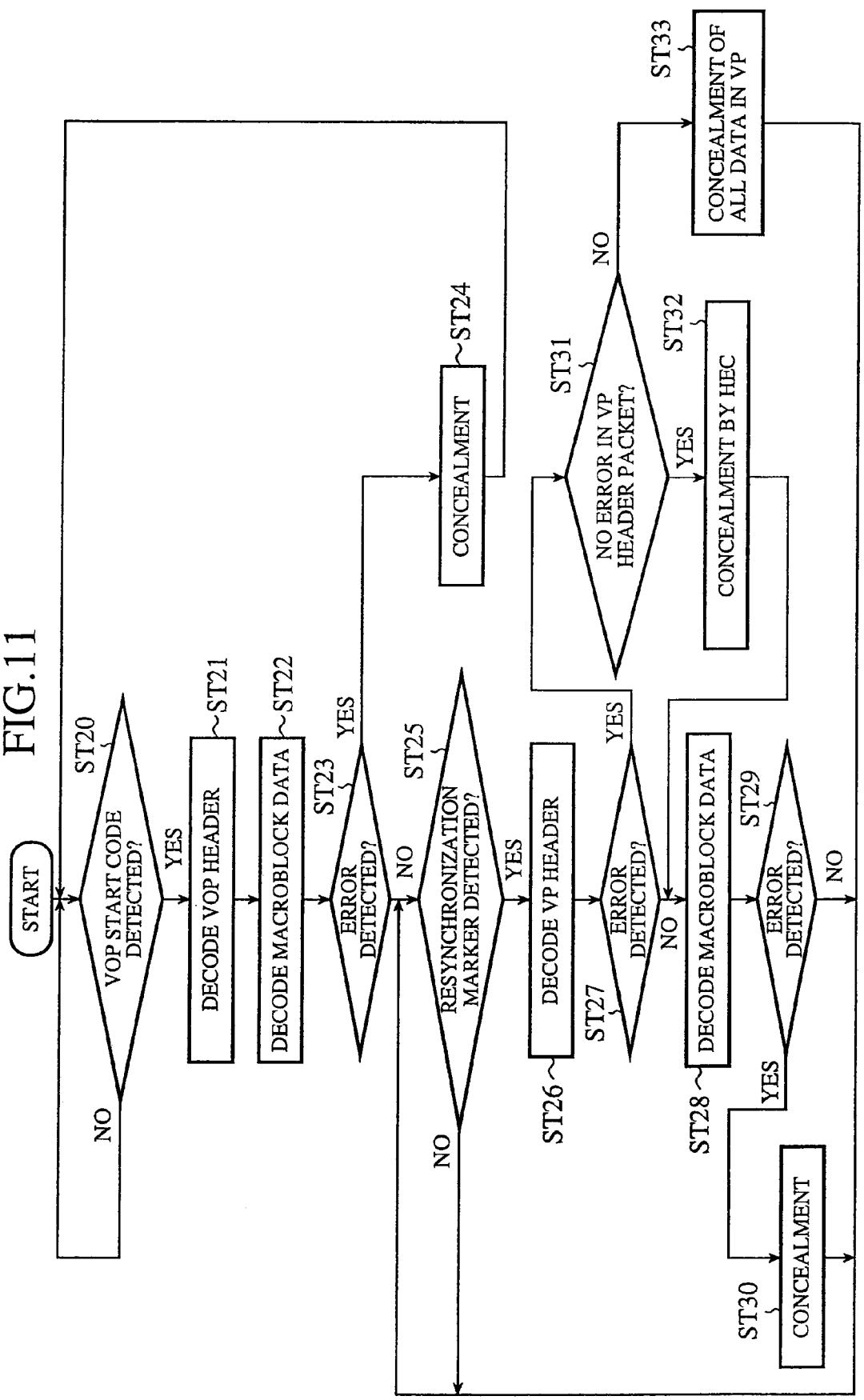

MPEG-4 CODED BIT STREAM

MPEG-4 CODED BIT STREAM

PACKET GENERATING METHOD, VIDEO DECODING METHOD, MEDIA MULTIPLEXER, MEDIA DEMULTIPLEXER, MULTIMEDIA COMMUNICATION SYSTEM AND BIT STREAM CONVERTER

This application is a Divisional of application Ser. No. 09/692,720 filed on Oct. 20, 2000, now U.S. Pat. No. 7,237,791 and for which priority is claimed under 35 U.S.C. § 120. Application Ser. No. 09/692,720 is the national phase of PCT International Application No. PCT/PCT/JP00/01009 filed on Feb. 22, 2000 under 35 U.S.C. § 371. The entire contents of each of the above-identified applications are hereby incorporated by reference. This application also claims priority of Application Nos. 11-043,707 filed in Japan on Feb. 22, 1999 and 11-049,857 filed in Japan on Feb. 26, 1999 under 35 U.S.C. § 119.

CROSS-REFERENCE TO THE RELATED APPLICATION

This application is a continuation of International Application No. PCT/JP00/01009, whose International filing date is Feb. 22, 2000, the disclosures of which Application are incorporated by reference herein.

BACKGROUND OF THE INVENTION

1. Field of the Invention

The present invention relates to a video packet generating method, a video decoding method, a media multiplexer, media demultiplexer and a multimedia communication system which are used in the process of sending coded audio, video (moving image) and data packets as a multiplexed stream from the transmitting side and demultiplexing the multiplexed stream into audio, video and data at the receiving side. Furthermore, the present invention also pertains to a bit stream converter which permits effective conversion of an error resistance syntax according to the channel condition.

2. Description of the Prior Art

To facilitate a better understanding of the present invention, a description will be given first of the case where a coded video stream encoded by a conventional video coding system, for example, the ITU-T Recommendation H. 263 (hereinafter referred to as H. 263), is sent after being multiplexed by the ITU-T Recommendation H. 223 (hereinafter referred to as H. 223). H. 223 defines a multiplexing system by which compress-coded audio, video and data streams are multiplexed into one bit stream for transmission.

FIG. 1 depicts the configuration of an H. 233-recommended multiplexing part. As shown, the multiplexing part comprises two hierarchies of an adaptation layer and a multiplexing layer. The adaptation layer input thereto, as packets called AL-SDU (Adaptation Layer Service Data Unit), coded streams from an application layer that encodes speech and video, and adds each packet (AL-SDU) with an error correcting code (CRC) and other necessary control information (AL-PDU (Adaptation Layer Protocol Data Unit). The multiplexing layer inputs thereto, as packets called MUX-SDU (Multiplex Service Data Unit), the packets (AL-PDU) of various media from the adaptation layer, and multiplexes them into one bit stream for transmission. The bit stream multiplexed in the multiplexing layer is called MUX-PDU (Multiplex Protocol Data Unit), and comprises a sync flag, a header and information fields for storing the packets (MUX-SDU). Incidentally, the method of dividing the coded streams from the application layer into packets (AL-SDU) for processing in the multiplexing part is outside of the scope defined by H. 223.

The above-mentioned multiplexing part is a function at the transmitting side. The receiving side has a demultiplexing part whose function is the inverse of the multiplexing at the transmitting side. In the demultiplexing part the bit stream (MUX-PDU) received in a demultiplexing layer is demultiplexed into packets of various media (MUX-SDU), which are output to the adaptation layer (AL-PDU). In the adaptation layer the error detecting code (CRC) contained in the packet (AL-PDU) is decoded and a check is made for an error in the received packet (AL-PDU). The result of error detection is output to the application layer together with the coded media information stream (AL-SDU) in the packet. It is outside the scope defined by H. 223 how to use the result of error detection in the application layer.

By the way, the video coding system by H. 263 encodes the input image into blocks of a predetermined size (each of which is comprised of a luminance signal of a 16 by 16 pixel size and a color difference signal of an 8 by 8 pixel size and is called a macroblock); it is considered that the coded video stream by H. 263 may be rendered into the packet AL-SDU, for example, by a method of combining piece of coded data of plural macroblocks into one packet.

As referred to above, however, it is recommended by H. 223 that the error detecting code be added for each packet AL-SDU and that the application layer at the receiving side receive the result of error detection together with the packet AL-SDU. Hence, when pieces of coded data of plural macroblocks are combined into one packet AL-SDU, it can be known from the result of error detection that there is an error in any one of the plural macroblocks contained in the packet AL-SDU, but it is impossible to specify the macroblock in which the error has occurred and the information in which the error has occurred. Accordingly, the prior art fails to practice error concealment by making effective use of the result of error detection received in the application layer.

Next, a description will be given of problems of the moving image communication between circuits of different error rates.

With the recent broadening the band of a digital transmission line and development of multimedia communication technology, it has become feasible to transmit moving image signals over various transmission lines. In the field of communication there is in widespread use a teleconference/videophone system that uses the H. 261 moving picture coding system on the ITU-TH. 320 terminal intended for connection to ISDN. Further, at the H. 324 terminal assumed to be connected to an analog public network, there are supported not only the H. 261 moving image coding system but also the H. 263 coding system which is higher in coding efficiency than the former coding system.

Moreover, there is recommended, as a terminal assumed to be connected to an IP network such the Internet, H. 323 that supports H. 261/H263 as is the case with H. 324. Accordingly, since at such wired system terminals there is supported a set of limited moving image coding systems based on ITU Recommendations, the interconnection of different protocols between terminals for limited use is guaranteed to some extent.

On the other hand, IMT-2000 is now under study by ITU as a standardization of a multimedia communication system using radio channels, and MPEG-4 of ISO is regarded as a likely moving image coding system. The diffusion of present portable terminals (such as PDC and PHS) are extremely wide, and if multimedia terminals based on IMT-200 comes into use as substitutes for existing portable telephones, an enormous demand therefor is expected. In such a case, the interconnection between the new multimedia terminals and existing wired system multimedia terminals is important, but this is the interconnection between channels of different error rates, not the interconnection between the existing wired-system circuits.

Predicated on the use with radio channels, MPEG-4 contains a function of increasing the error resistance at the video data level; there has not been established so far a technique for effectively converting the function at the time of interconnecting the multimedia terminals.

The conventional bit stream converter has such a construction as described above, and hence it has a defect that an error resistance syntax cannot effectively be converted between the moving image coding system used in a channel of low error rate and the moving image coding system used in a channel of high error rate according to channel conditions.

SUMMARY OF THE INVENTION

It is therefore an object of the present invention to provide a media multiplexer, a moving image decoder and a multimedia communication system which permit easy recovery from errors in the decoding of coded video streams by multiplexing their important information into single packets each added with an error detecting code at the transmitting side so that the presence or absence of an error in the important information area can be decided at the receiving side by decoding the error detecting code for each packet.

Another object of the present invention is to provide a bit stream converter which permits effective conversion of an error resistance syntax between moving image coding systems used in communication lines or channels of low and high error rates according to channel conditions.

According to a first aspect of the present invention, there is provided a video packet generating method which divides a coded video stream into plural video segments and generates packets each added with an error detecting code for each video segment. The coded video stream is composed of compressed block coded data, and the block coded data is composed of plural kinds of data elements, the data elements of the same kind being arranged in succession over plural blocks. The coded video stream is divided, at the point of change in the kind of the data elements arranged in succession, into the packets each added with the error detecting code for each video segment.

With this video packet generating method, it is possible to decide at the receiving side whether an error has occurred in each data sequence by the error detecting code added to each data sequence.

According to a second aspect of the present invention, there is provided a video decoding method which receives a coded video stream, together with an error detection result indicating whether an error is contained in a coded stream in each packet, and decodes the coded video stream. The coded video stream is composed of plural pieces of compressed block coded data. The plural pieces of compressed block coded data are composed of plural kinds of data elements. The data elements of the same kind are arranged in succession over plural blocks, and the coded video stream is divided, at the point of change in the kind of the data elements arranged in succession, into each packet, the each packet being added, for each of the coded video streams, with an error detecting code for obtaining the error detection result. Upon detecting a decoding error at the time of receiving and decoding the coded video stream for each packet, the position of the decoding error in the coded video stream is decided based on an error detection result received and error concealment is selectively performed based on the decided position of the decoding error.

With this video decoding method, it is possible to decide at the receiving side whether an error has occurred in each data sequence by the error detecting code added to each data sequence. By practicing error concealment through utilization of the decision result and the position of an error detected in variable-length decoding, coded video streams can be decoded with increased error resistance.

According to a third aspect of the present invention, the plural kinds of data elements contain a data stream composed of motion vectors contained in plural blocks and a data stream composed of pieces of texture information contained in plural blocks. Based on said error detection result received together with each data stream and the position of the decoding error detected in the decoding of each data stream, it is decided whether to perform error concealment using decoded motion vectors or abandon the motion vectors and the texture data and perform error concealment.

With this video decoding method, it is possible to decide at the receiving side whether an error has occurred in each data sequence by the error detecting code added to each data sequence. By practicing error concealment through utilization of the decision result and the position of an error detected in variable-length decoding, coded video streams can be decoded with increased error resistance.

According to a fourth aspect of the present invention, there is provided a video packet generating method which divides a coded video stream into plural video segments and generates packets each added with an error detecting code for each of said plural video segments. The coded video stream is composed of compressed block coded data, and for each block coded data of plural blocks, header information is coded which contains a unique code indicating the head of each block coded data and its block number. The coded video stream is divided into packets at the point of change between the header information and the compressed block coded data, the packets being added with the error detecting code for each of the plural video segments.

With this video packet generating method, it is possible to decide at the receiving side whether an error has occurred in the header information by the unique code for resynchronization and the error detecting code added to the header information.

According to a fifth aspect of the present invention, there is provided a video decoding method which receives a coded video stream, together with an error detection result indicating whether an error is contained in a coded stream in each packet, and decodes the coded video stream. The coded video stream is composed of plural pieces of compressed block coded data, and for each of the compressed block coded data of plural blocks, header information is coded which contains a unique code indicating the head of each block coded data and its block number. The coded video stream is divided into packets at the point of change between the header information and the block coded data, the packets being added, for each of the plural video segments, with an error detecting code for obtaining the error detection result. Upon detecting a decoding error during decoding of the coded video stream received for each packet, the position of resynchronization is decided based on the unique code and the error detection result received together with coded data of the header information, and resynchronization is performed from the bit position of error detection to a unique code indicating the beginning of the next block coded data.

With this video decoding method, it is possible to decide at the receiving side whether an error has occurred in the header information by the unique code for resynchronization and the error detecting code added to the header information. By practicing error concealment through utilization of the decision result and the potion of an error detected in variable-length decoding, coded video streams can be decoded with increased error resistance.

According to a sixth aspect of the present invention, there is provided in which packets of coded video streams generated by said video packet generating method according to the first aspect of the invention and packets of audio and data, generated by dividing coded audio and data streams, are multiplexed into one stream for output as a multiplex stream.

With this media multiplexer, it is possible to decide at the receiving side whether an error has occurred in each data sequence by the error detecting code added to each data sequence.

According to a seventh aspect of the present invention, packets of coded video streams generated by the video packet generating method according to the fourth aspect of the invention and packets of audio and data, generated by dividing coded audio and data streams, are multiplexed into one stream for output as a multiplex stream.

With this media multiplexer, it is possible to decide at the receiving side whether an error has occurred in the header information by the unique code for resynchronization and the error detecting code added to the header information.

According to an eighth aspect of the present invention, the multiplex stream by the media multiplexer according to the sixth aspect of the invention is demultiplexed into packets of coded video streams and packets of coded audio and data streams, and an error detecting code contained in each packet is decoded to obtain an error detection result. The packets of coded video streams are decoded into video packets by the video decoding method according to the second, third, or fifth aspect of the invention based on the error detection result for each coded video stream concerned.

With this media multiplexer, it is possible to decide at the receiving side whether an error has occurred in each data sequence by the error detecting code added to each data sequence. Furthermore, the coded video streams can be decoded with increased error resistance.

According to a ninth aspect of the present invention, the multiplex stream by the media multiplexer according to the seventh aspect of the invention is demultiplexed into packets of coded video streams and packets of coded audio and data streams, and an error detecting code contained in each packet is decoded to obtain an error detection result. The packets of coded video streams are decoded into video packets by the video decoding method of the second, third, or fifth aspect of the invention based on the error detection result for each video coded string concerned.

With this media demultiplexer, it is possible to decide at the receiving side whether an error has occurred in the header information by the unique code for resynchronization and the error detecting code added to the header information. Furthermore, the coded video streams can be decoded with increased error resistance.

According to a tenth aspect of the present invention, there is provided a multimedia communication system which is provided with a transmitting device and a receiving device. The transmitting device: encodes various pieces of media information, such as audio, video and data, into coded streams; divides the coded streams into various media packets; multiplexes the various media packets, each added with an error detecting code, into a stream; and transmits the multiplex stream over a communication line. The receiving device: receives the multiplex stream sent from the transmitting device; demultiplexes the multiplex stream into the various media packets; and decodes the various media packets in media information decoding parts corresponding thereto. The receiving device comprises means for decoding the error detecting code added for each of the various media packets. The transmitting device comprises: means for monitoring the error condition of the communication line based on an error detected in the receiving device; and means for generating video packets by dividing a coded video stream in varying unit of division according to the error condition of the communication line.

With this multimedia communication system, it is possible to implement packet generation with increased error resistance when the error rate is low and reduction of the redundancy resulting from the packet generation when the error rate is high.

According to an eleventh aspect of the present invention, there is provided a multimedia communication system which is provided with a transmitting device and a receiving device. The transmitting device: encodes various pieces of media information, such as audio, video and data, into coded streams; divides the coded streams into various media packets; multiplexes the various media packets, each added with an error detecting code, into a stream; and transmits the multiplex stream over a communication line. The receiving device: receives the multiplex stream; demultiplexes the multiplex stream into the various media packets; and decodes the various media packets in media information decoding parts corresponding thereto. The receiving device comprises means for decoding the error detecting code added for each of the various media packets. The transmitting device comprises: means for monitoring the error condition of said communication line based on an error detected in the receiving device; and means for multiplexing the media packets of audio, vide and data into one stream while changing the ratios of audio, video and data in the multiplex stream according to the error condition of the communication line.

With this multimedia communication system, when the error rate is high, the media packet of video is divided to lower the rate of the media packet of video contained in one multiplex stream, by which it is possible to prevent the occurrence of many errors in one video packets, and hence provide increased error resistance.

According to a twelfth aspect of the present invention, there is provided a bit stream converter which is provided with syntax rule decision means for changing a rule of a coded bit stream syntax. A predetermined one of plural syntax rules is selected by the syntax rule decision means.

With this bit stream converter, it is possible to implement an effective conversion of a bit stream according to the line condition.

According to a thirteenth aspect of the present invention, the syntax rule decision means selects one of the plural syntax rules according to the quality of a communication line over which the converted bit stream is transmitted.

With this bit stream converter, it is possible to provide an appropriate coded bit stream in accordance with the condition of the transmission line over which it is sent.

According to a fourteen aspect of the present invention, line quality monitoring means is provided for detecting an error of an input bit stream to thereby detect the line quality by the line quality monitoring means.

With this bit stream converter, it is possible to implement monitoring of the line quality accurately reflecting the error condition of the transmission line.

According to a fifteenth aspect of the present invention, the syntax rule decision mans selects predetermined combination of syntaxes, on a one-by-one basis, from four kinds of MPEG-4 error resistance syntaxes which are resynchronization data unit/header multiplex/data division/two-way decodable code words.

With this bit stream converter, it is possible to provide an efficient bit stream according to the line condition while achieving a balance between the degree of error resistance of the moving image coded bit stream to be sent over a transmission line of high error rate and the transmission efficiency as a whole.

According to a sixteenth aspect of the present invention, there is provided a bit stream converter which comprises: syntax analysis means which analyzes a first bit stream according to a predetermined rule, separates the first bit stream into coded data and detects an analysis error; and coded data converting means which converts coded data, lost by the analysis error, into an error-free value on a syntax based on a moving image coding method at the destination of a second bit stream.

With this bit stream converter, a terminal which receives a coded bit stream based on the moving image coding method operates on the predication that it is connected to a high quality transmission line; hence, it is possible to perform decoding while suppressing deterioration of the picture quality even if no particular measures are taken against errors.

According to an eighteenth aspect of the present invention, there is provided a bit stream converter which comprises: syntax analysis means which analyzes a first bit stream according to a predetermined rule, separates the first bit stream into coded data and detects an analysis error; and coded data converting means which concerts coded data at the position of detection of the analysis error or in its vicinity into data recognizable as an analysis error on a syntax based on a moving image coding system at the destination of transmission.

With this bit stream converter, it is possible to provide an appropriate coded bit stream in accordance with the condition of the transmission line over which it is sent. Moreover, a terminal which receives a coded bit stream based on the moving image coding method operates on the predication that it is connected to a high quality transmission line; hence, it is possible to perform decoding while suppressing deterioration of the picture quality even if no particular measures are taken against errors.

BRIEF DESCRIPTION OF THE DRAWINGS

Other objects, features and advantages of the present invention will become more apparent from the following description taken in conjunction with the accompanying drawings, in which:

FIG. 10 is a diagram for explaining a scheme for mapping a coded video stream into packets (AL-SDU) according to the second embodiment;

FIG. 11 is a flowchart depicting the decoding procedure according to the second embodiment;

FIG. 12 is a diagram showing an example of the detection of an error in the decoding of VP header information;

DETAILED DESCRIPTION OF THE PREFERRED EMBODIMENTS

A description will be given, with reference to the accompanying drawings, of the preferred embodiments of the present invention.

Embodiment 1

Figure 2:
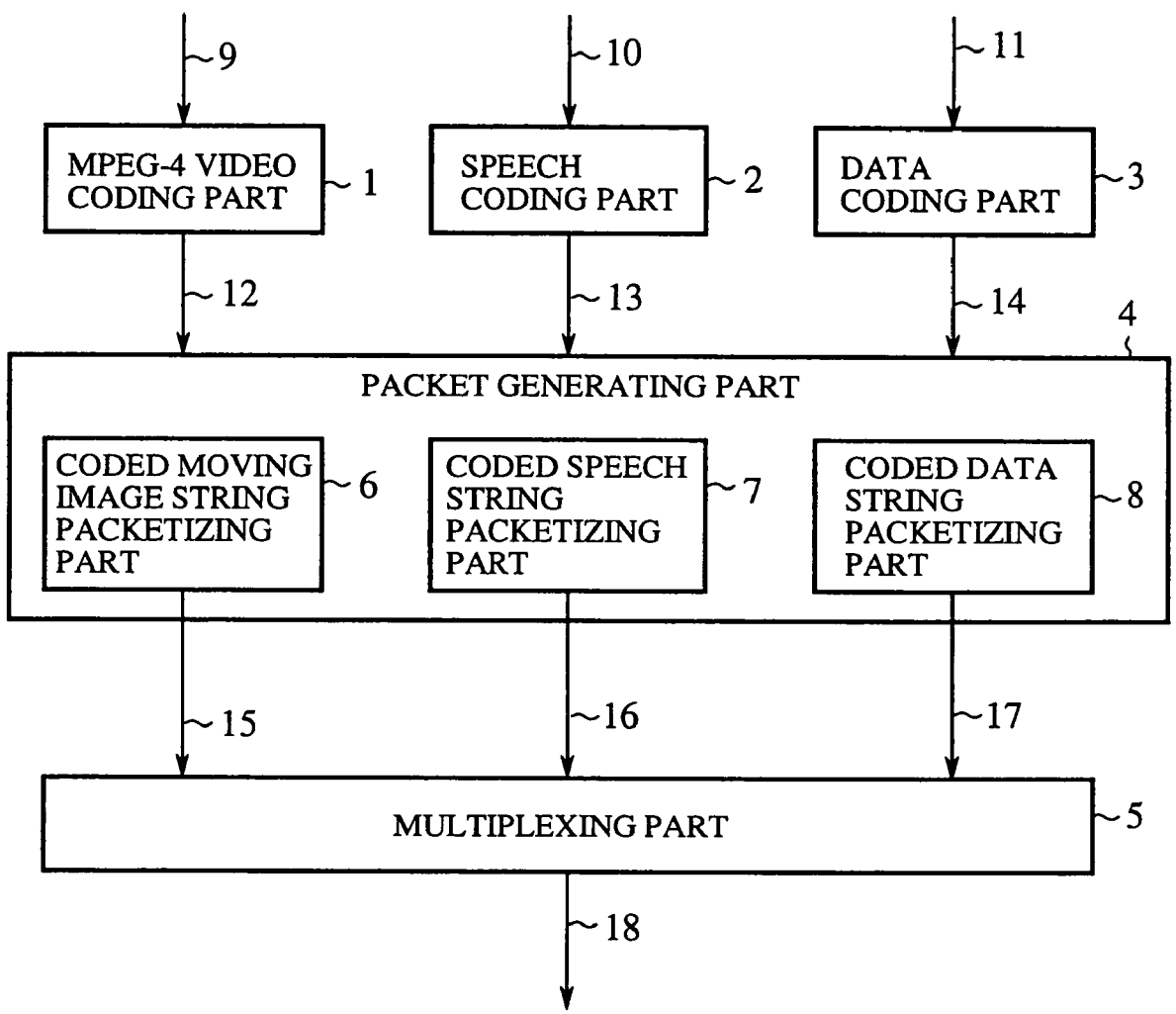
FIG. 2 is a block diagram illustrating the configuration of a transmitting device of a multimedia communication system according to a first embodiment of the present invention.

FIG. 2 is a block diagram illustrating a transmitting apparatus of a multimedia communication system according to a first embodiment (Embodiment 1) of the present invention in which a coded video stream, encoded by the MPEG-4 coding system (ISO/IEC 14496-2), is multiplexed by H. 223 together with coded speech and data streams at the transmitting side and transmitted therefrom and at the receiving side the multiplexed stream is demultiplexed into the original speech, video and data. Reference numeral 1 denotes an MPEG-4 video coding part; 2 denotes a speech coding part; 3 denotes a data coding part; 4 denotes a packetizing part; 5 denotes a multiplexing part; 6 denotes a coded video stream packetizing part; 7 denotes a coded speech stream packetizing part; 8 denotes a coded data stream packetizing part; 9 denotes an input image signal; 10 denotes an input speech signal; 11 denotes an input data signal; 12 denotes a coded video stream; 13 denotes a coded speech stream; 14 denotes a coded data stream; 15 denotes a packet of the coded video stream; 16 denotes a packet of the coded speech stream; 17 denotes a packet of the coded data stream; and 18 a multiplexed stream.

The MPEG-4 video coding part 1 compress-encodes the input image signal 9 and outputs the coded video stream 12. The speech coding part 2 compress-codes the input speech signal 10 by an arbitrary speech coding scheme and outputs the coded speech stream. The data coding part 3 compress-codes the input data signal 11, such as a signal for video and audio synchronization or control signal, or changes the data structure of the input data signal 11 and outputs the coded data stream 14.

In the packetizing part 4, the coded video, speech and data streams 12, 13 and 14 are broken into packets (AL-SDU) 15, 16 and 17, respectively, for processing in the multiplexing part 5. The thus generated packets (AL-SUD) 15, 16 and 17 are each added with an error detecting code or the like, and in the multiplexing part 5 the packets of the coded video, speech and data streams (MUX-SDU) are multiplexed into the multiplexed stream (MX-PDU) 18 for output. The operation of the multiplexing part 5 is such as described previously with respect to the prior art.

A detailed description will be given of the packetizing part 4 characteristic of this embodiment.

While the packetizing part 4 comprises the coded video, speech and data stream packetizing parts 6, 7 and 8, the operation of the coded video stream packetzing part 6, in particular, will be described below.

Now, let it be assumed that the coded video stream 12 provided from the MPEG-4 video coding part 1 is coded using the data partitioning scheme defined by MPEG-4 as described later on.

A description will be given first of the structure of the coded video stream 12 that is output from the MPEG-4 coding part 1.

Figure 3:
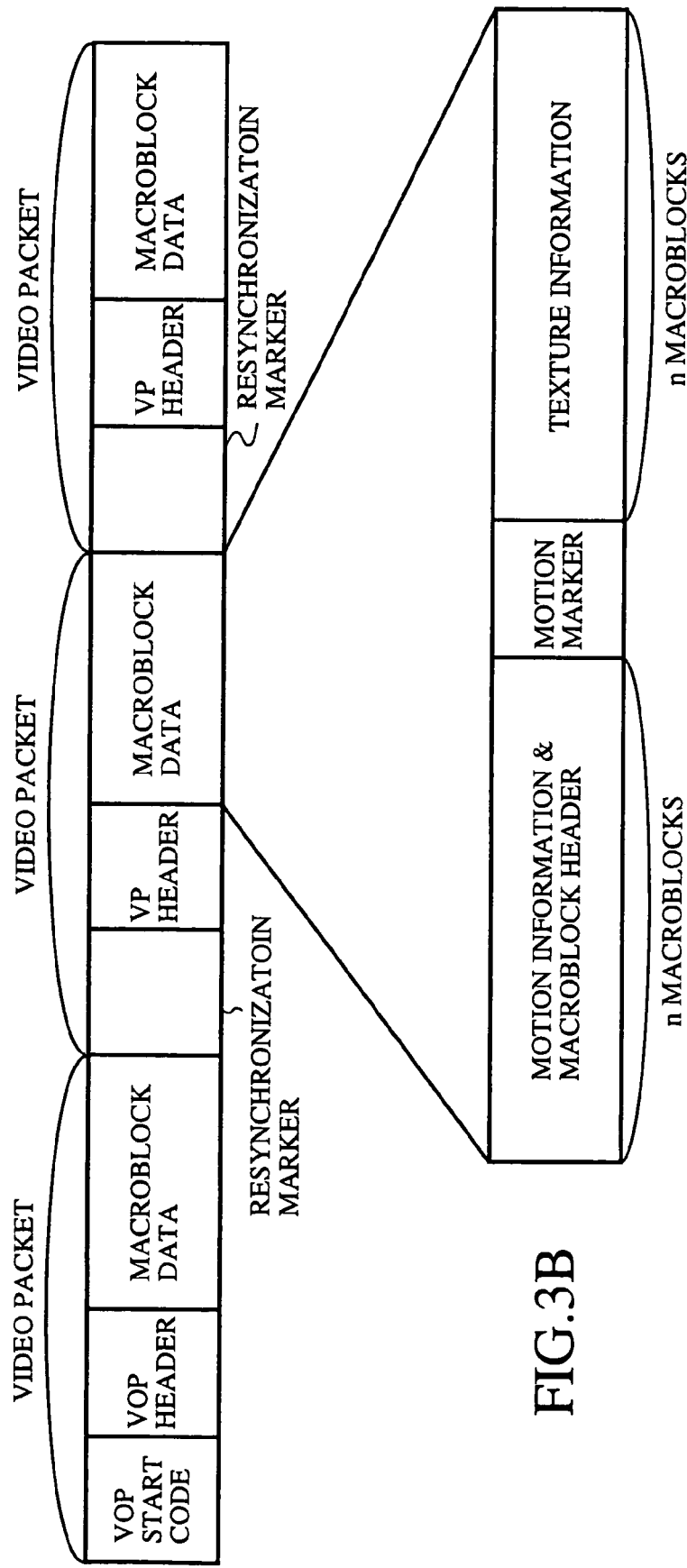
FIG. 3 is a diagram depicting the structure of a coded video stream that is output from an MPEG-4 video coding part 1.

As depicted in FIG. 3, each frame of the input image (called VOP (Video Object Plane) in MPEG-4) is encoded for each resynchronization unit called a video packet.

The video packet is a set of plural macro blocks in the image space. On the coded video stream, as shown in FIG. 3(a), the video packet is composed of coded data in units of macro blocks (macro block data), a unique word for resynchronization (a resynchronization marker) and header information necessary for resynchronization (a VP header). In the first video packet of each frame, a unique code (a VOP start code) indicating the front end of the frame and header information (VOP header) necessary for decoding coded data in each frame are coded in place of the resynchronization marker and the VP header, respectively, as depicted in FIG. 3(a).

What is intended to mean by "data partitioning" is to provide such a structure as shown in FIG. 3(b) in which when the macro block data in the video packet contains information about n macro blocks, motion vectors and pieces of header information on the n macro blocks and pieces of texture information on the n macro blocks are arranged at different locations. The boundary between the motion vector and the texture information is defined by a unique word referred to as a motion marker.

The coded video stream packetizing part 6 divides the coded video stream of the FIG. 3 structure into packets (AL-SDU) for processing in the multiplexing part 5 and outputs the packets (AL-PDU).

Figure 4:
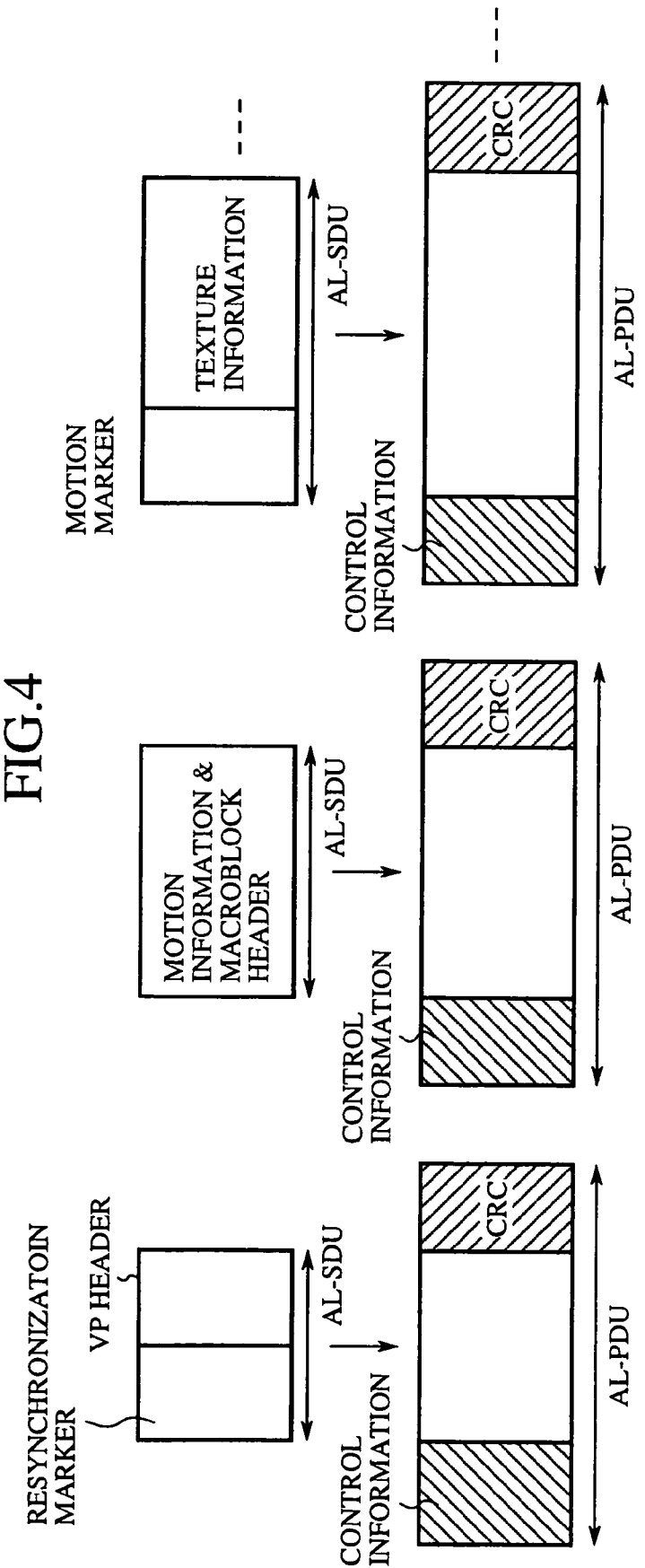
FIG. 4 is a diagram for explaining how to divide the coded video stream into packets (AL-SDU)

FIG. 4 depicts how to divide the coded video stream 15 into the packets (AL-SDU) to generate therefrom the packets (AL-PDU).

As depicted in FIG. 4, the input coded video stream 15 is divided into the video packets shown in FIG. 3(a), and a set of motion information and macro block header information, a set of motion marker and texture information and a set of resynchronization marker and VP header that are contained in the respective video packets are each mapped as one packet (AL-SDU). Incidentally, since the front-end video packet has added thereto the VOP start code and the VOP header in place of the resynchronization marker and the VP header as referred to above, the VOP start code and the VOP header are mapped as one packet (AL-SDU) as a substitute for the set of resynchronization marker and VP header.

The length of each packet (AL-SD U) needs to be an integral multiple of 8 bits, but the information (the motion information and the macro block header information, the motion marker and the texture information, and the resynchronization marker and the VP header) to be mapped as one packet is not always an integral multiple of 8 bits. Accordingly, there are cases where each of the sets of motion information and macro block header information, motion marker and texture information, and resynchronization marker and VP header are not accurately mapped as one packet but the motion information is partly contained in the packet in which the resynchronization marker and the VP header.

Since the length of one video packet formed by each packet (AL-SDU) is an integral multiple of 8 bits, however, there is no possibility of data of different video packet being mapped into the same packet.

The multiplexing part 5 adds, as depicted in FIG. 4, each packet (AL-SDU) with an error detecting code (CRC) and, if necessary, control information, generating the packet (AL-PDU). In some cases, each packet (AL-SDU) is subdivided into plural packets, which are each added with an error correcting code and then added with the error detecting code (CRC) and the control information to generate the packet (AL-PDU).

Next, a description will be given of the construction and operation of a receiving apparatus which receives the multiplexed stream sent from the transmitting apparatus and decodes it into various pieces of media information such as speech, video and data.

Figure 5:
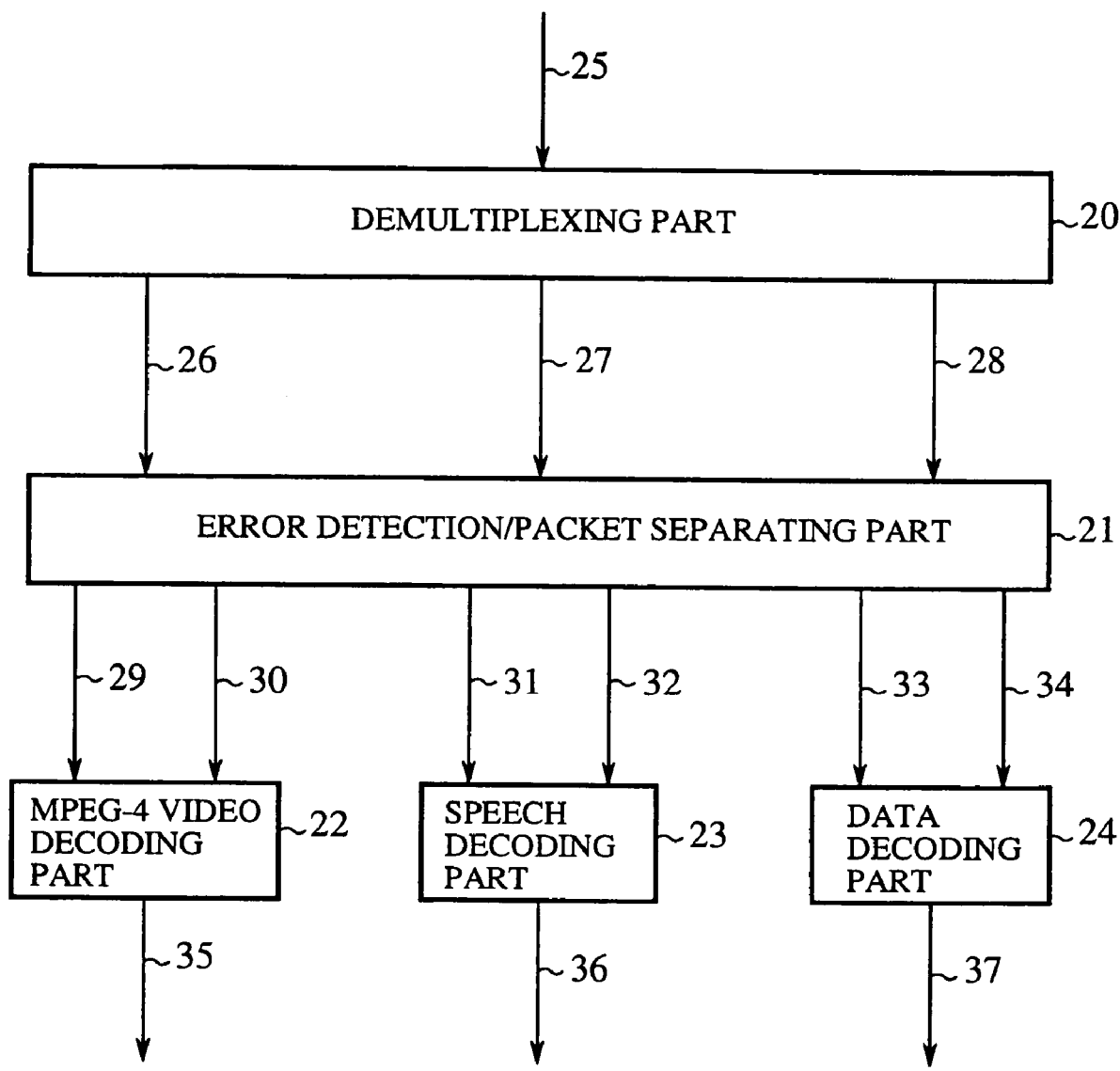
FIG. 5 is a block diagram depicting the configuration of a receiving device of the multimedia communication system according to the first embodiment.

FIG. 5 is a block diagram of the receiving apparatus for use in the multimedia communication system. Reference numeral 25 denotes a multiplexed stream; 26 denotes a video-media packet for video, 27 denotes a speech-media packet; 28 denotes a data-media packet; 29 denotes a packet of the coded video stream; 30 denotes the result of error detection in the coded video stream; 31 denotes a packet of the coded speech stream; 32 denotes the result of error detection in the coded speech stream; 33 denotes a packet of the coded data stream; 34 denotes the result of error detection in the coded data stream; 35 denotes a decoded image signal 36 denotes a decoded speech signal; and 37 denotes a decoded data signal.

A demultiplexing part 20 demultiplexes the multiplexed stream 25 into speech- video- and data media packets (MUX-SDU) through utilization of a synchronization flag and header information contained in the stream 25. The media packets 26 to 28 are fed into an error detecting/packet separating part 21, in which error detecting codes contained in the media packets 26 to 28 are decoded, and the packets (AL-SDU) 29, 31 and 33 from which the error detecting codes and the control information have been removed, and the decoded error detection results 30, 32 and 34 are provided to information source decoding parts 22 to 24 respectively corresponding to them.

When the media packet contains a code for error correction, the code is decoded for correction of an error in the media packet. Whether the media packet still contains an error remaining in excess of the error correcting capability is checked by decoding an error detecting code that is contained in the media packet after the decoding the code for error correction. In this instance, the packets (AL-SDU) 29, 31 and 33, obtained by removing the error correcting codes, the error detecting codes and the control information from the media packets 26 to 28, and the results of error detection 30, 32 and 34 are provided to information source decoding parts 22 to 24 respectively corresponding to them. That is, the packet 29 of the coded video stream is fed to an MPEG-4 video decoding part 22; the packet 31 of the coded speech stream is fed to a speech decoding part 23; and the packet 33 of the coded data stream is fed to a data decoding part 24.

Next, the construction and operation of the MPEG-4 video decoding part 22 in this embodiment will be described below.

Figure 6:
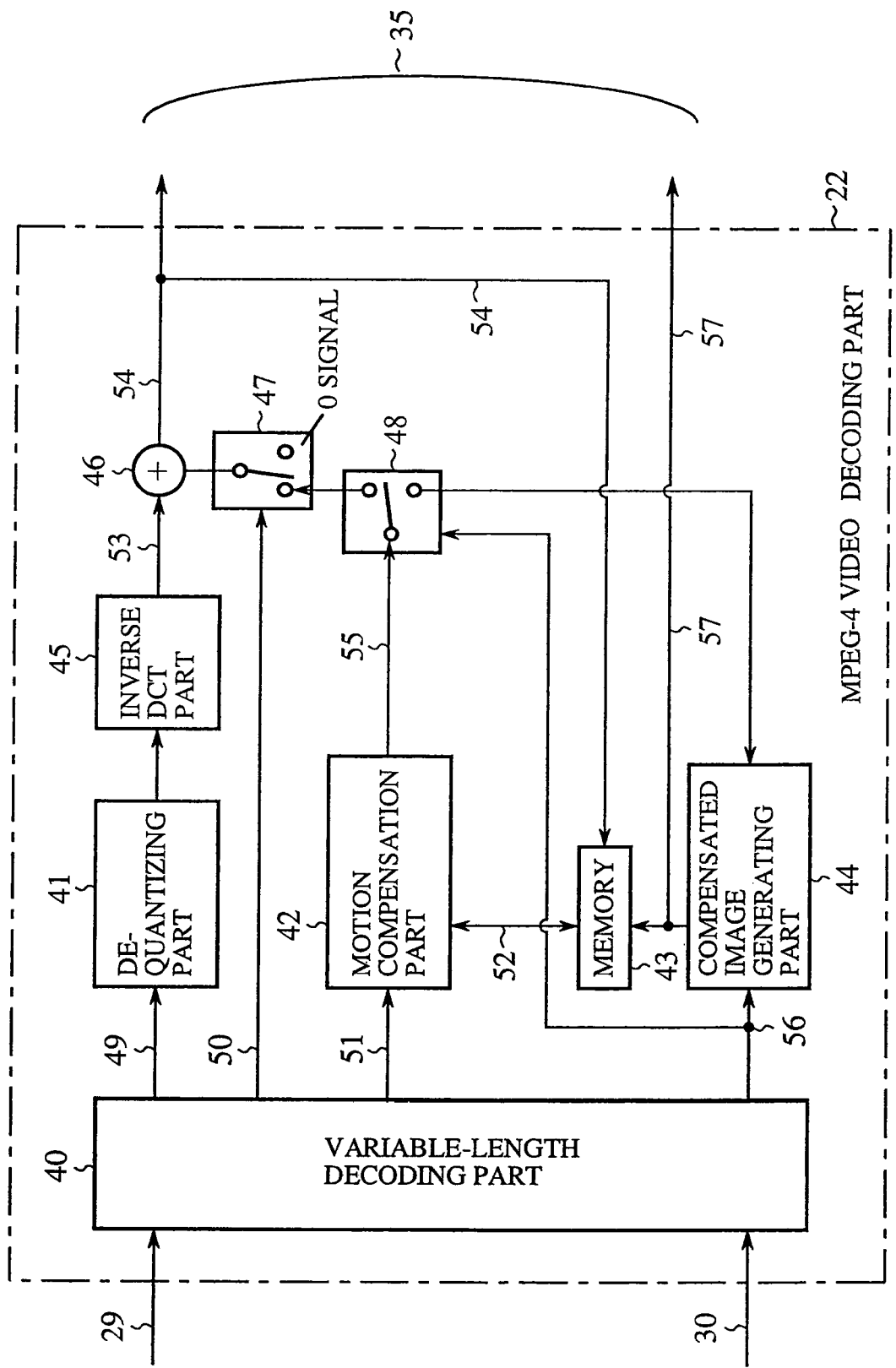
FIG. 6 is a block diagram depicting the configuration of an MPEG-4 video decoding part 22.

FIG. 6 illustrates in block form the configuration of the MPEG-4 video decoding part 22. Reference numeral 40 denotes a variable-length decoding part; 41 denotes a de-quantizing part; 42 denotes a motion compensating part; 43 denotes a memory; 44 denotes a compensated image generating part; 45 denotes an inverse DCT part; 46 denotes an adding part; 47 and 48 denote a switching parts; 49 denotes decoded block data; 50 decoded additional information; 51 denotes a motion vector; 52 denotes a reference image; 53 a decoded prediction error signal; 54 denotes a decoded image; 55 denotes a predicted image; 56 denotes an error detection flag; and 57 denotes a compensated image. Reference numeral 35 denotes a decoded image signal that is output from the MPEG-4 video decoding part 22.

The packet of the coded video stream 29 is decoded with a variable length in the variable-length decoding part 40 based on the syntax defined by MPEG-4.

Figure 1:
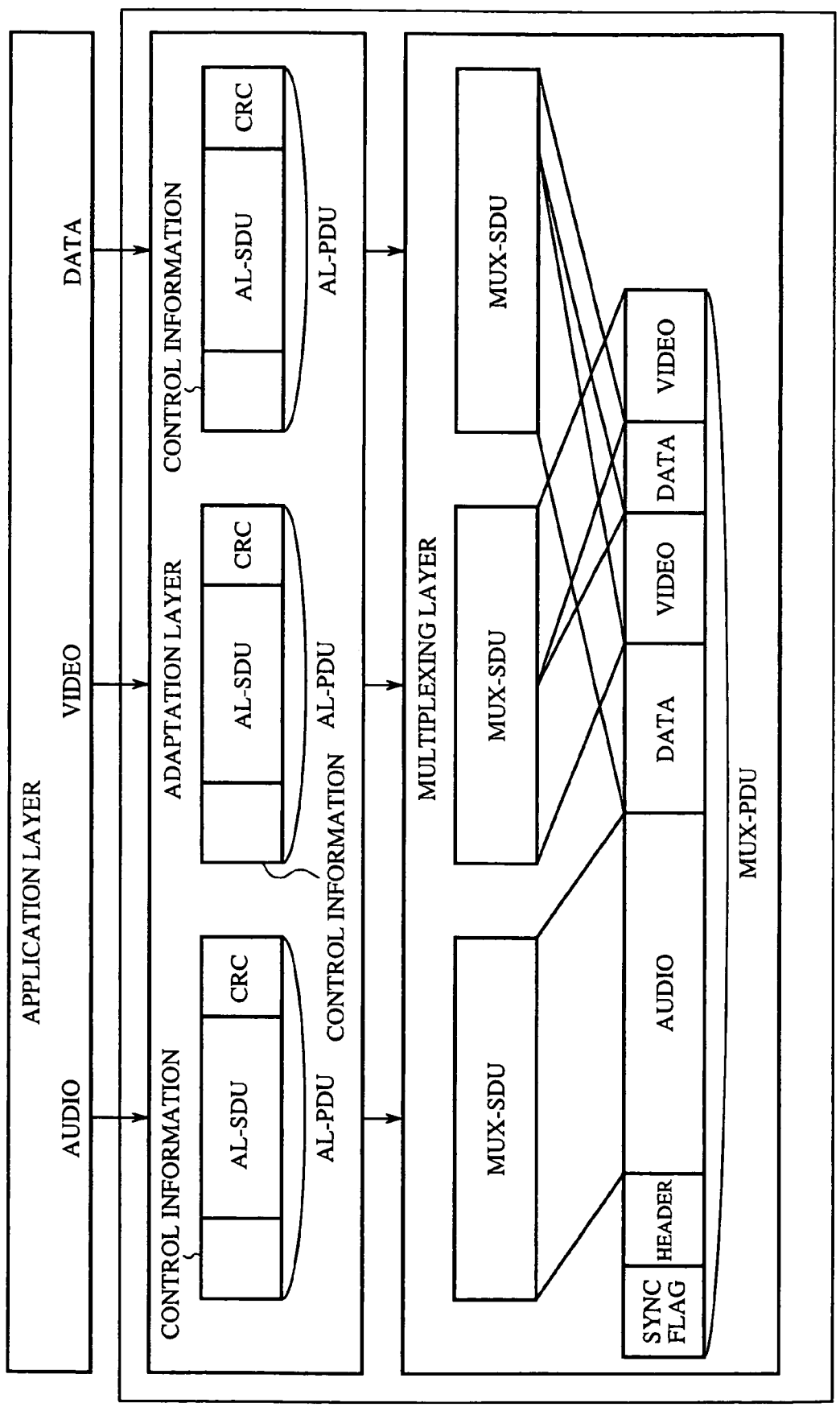
FIG. 1 is a diagram showing the configuration of an H.223-recommended multiplexing part.

The variable-length decoding part 40 is equipped with mechanism for detecting an error in the decoding of the coded video stream 29; when the decoded value is incorrect, or when the continuation of decoding is impossible due to loss of synchronization, it is detected as a decoding error. Upon detecting such an error, the variable-length decoding part 40 provides the error detection flag 56 to the compensated image generating part 44. In the case of decoding the packet of the coded video stream encoded by the data partitioning function as depicted in FIG. 1c), when an error is detected not in the motion information area but in the texture information area (see FIG. 4), the error detection flag 56 is provided to the switching part 48.

The motion vector 51 decoded in the variable-length decoding part 40 is fed to the motion compensation part 42. Based on the motion vector 51, the motion compensation part 42 extracts the predictive image 55 from the reference image 52 stored in the memory 43. The predictive image 55 is provided to the switching part 48, through which it is fed to the compensated image generating part 44 or adding part 46, depending upon whether the switching part 48 has received the error detection flag 55 from the variable-length decoding part 40.

The block data 49 decoding in the variable-length decoding part 40 is provided via the de-quantizing part 41 to the inverse DCT part 45, from which it is provided as the decoded prediction error signal 53. The decoded prediction error signal 53 is applied to the adding part 46, wherein it is added to the predictive image 55 from the motion compensation part 42 to obtain the decoded image signal 54. Incidentally, when the macro block type contained in the decoded additional information 50 indicates intra-coding, a "0" signal is chosen in the switching part 47 and the decoded prediction error signal 53 is not added with the predictive image 55 and becomes the decoded image 54. The decoded image 54 mentioned herein means a decoded macro block, which is composed of four luminance blocks and two color difference blocks. The decoded image 54 is written in the memory 43 so that it is used as a reference image of the next frame.

Now, a detailed description will be given of the variable-length decoding part 40 characteristic of this embodiment.

When the receiving apparatus has received the multiplexed stream sent from the transmitting apparatus shown in FIG. 2, the coded video stream 29 is input to the variable-length decoding part 40 of the MPEG-4 video decoding part 22 in such a manner that the motion information and the macro block header information, the motion marker and the texture information, and the resynchronization marker and the VP header, contained in the video packets, are provided in the form of single packets, respectively, as depicted in FIG. 4. In this case, each packet is accompanied by the error-detection result 30 indicating whether an error is contained in the packet.

The decoding of the coded video stream 29 with a bit error contained therein will be described below.

Figure 7:
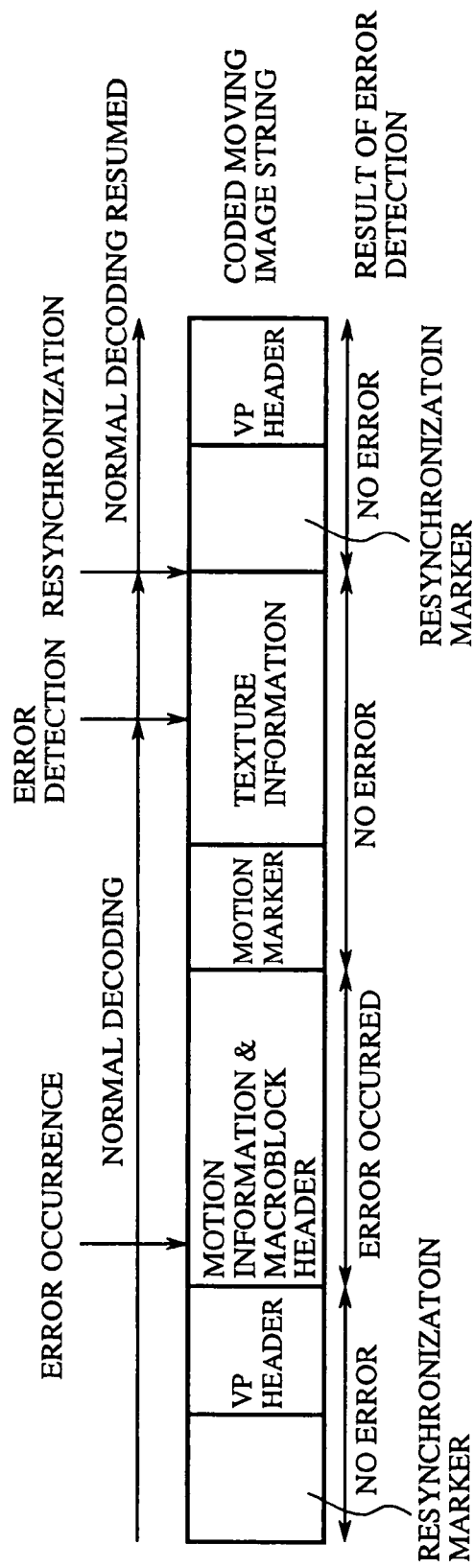
FIG. 7 is a diagram showing an example of decoding when a bit error is contained in the coded video stream.

FIG. 7 shows, by way of example, the result of error detection in the case where a bit error occurs in the information area of motion information and macro block header. In the illustrated example, the coded moving image string 29 is decoded normally halfway through the texture information although the bit error has occurred in the information area of motion information and macro block header, and the bit error is detected in the texture information area.

In such a case, according to the prior art, the result of decoding until the detection of an error is regarded as correct and concealment of the error is started at the position where the error was detected. Accordingly, in the case of FIG. 7, the next resynchronization marker is searched, and at the same time the coded stream from the position where the error was detected to the resynchronization is abandoned, and the macro block at the position where the error was detected and the subsequent information area are compensated for by macro block data which is generated using the motion vector decoded before the motion marker.

In the case of FIG. 7, however, since the error has occurred in the information area of motion information and macro block header, the generation of a compensated image using the incorrectly decoded motion vector and macro block header information will seriously deteriorate the subjective picture quality of the decoded image.

To avoid this, the MPEG-4 video decoding part 22 of this embodiment practice concealment of the error through utilization of the error-detection result 30 which is input together with the packet of the coded video stream 29.

Figure 8:
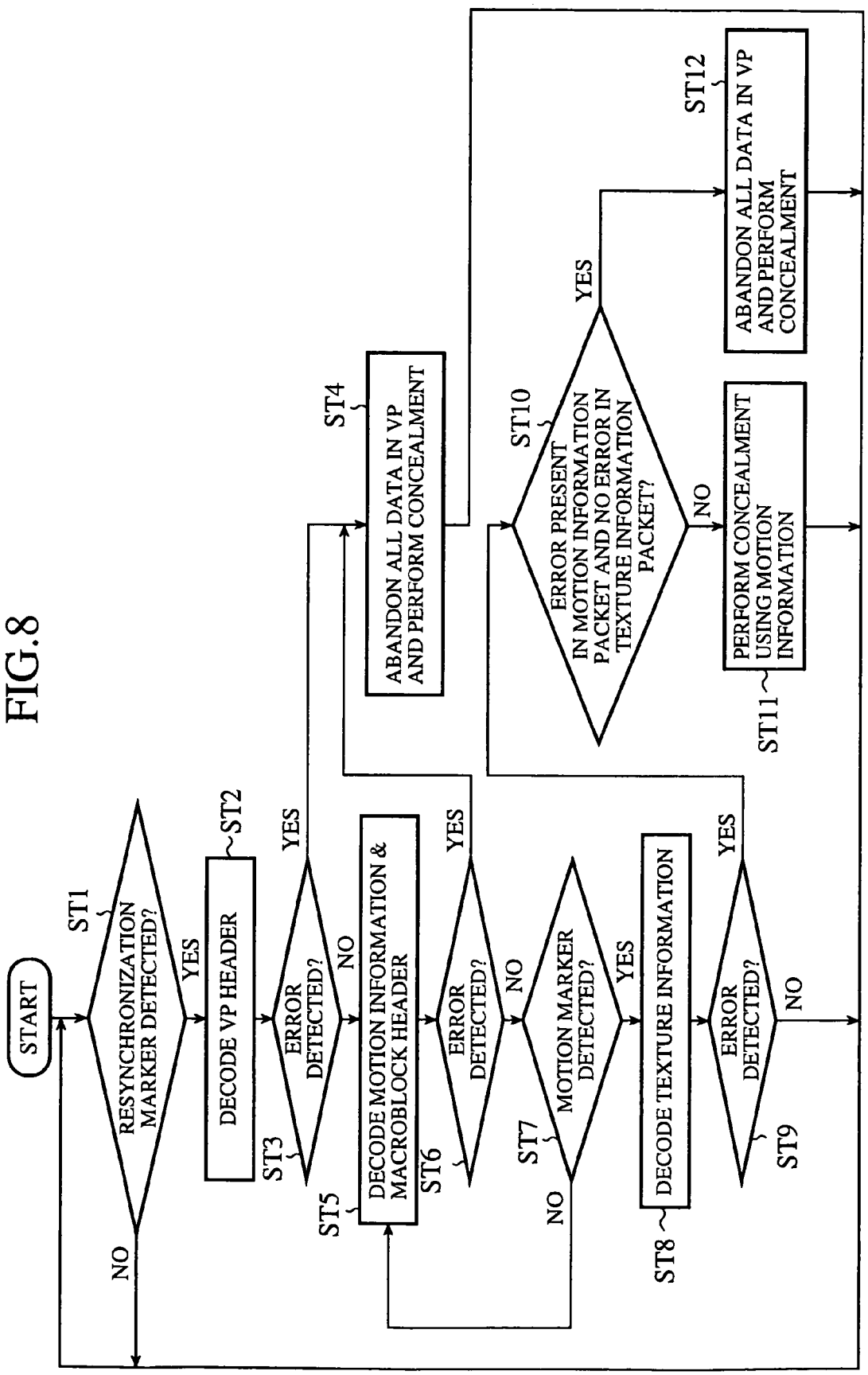
FIG. 8 is a flowchart for explaining decoding in the MPEG-4 video decoding part 22.

FIG. 8 is a flowchart for explaining the decoding procedure in the MPEG-4 video decoding part 22.

As depicted in FIG. 7, the video decoding part 22 first detects the resynchronization marker indicating the head of the video packet (step ST1 "Yes"), then decodes the VP header information (step ST2), and at the same time makes a check for an error in the decoding of the VP header (step ST3). If an error is detected in the decoding of the VP header information (step ST3 "Yes"), the video decoding part 22 abandons the entire data of the video packet (VP) having the VP header, and practices concealment (step ST4).

On the other hand, when no error is detected in the decoding of the VP header information (step ST3 "No"), the video decoding part 22 decodes the motion information and macro block header information contained in the next packet (AL-SDU) (see FIG. 4) (step ST5), and at the same time makes a check for a decoding error (step ST6). The decoding of the motion information and the macro block header information in step ST5 and the error check in the step ST6 are repeated until the detection of the motion marker contained in the next packet (AL-SDU) (step ST7 "Yes").

If an error is detected in the decoding of the motion information and the macro block header information (step ST6 "Yes"), the video decoding part 22 abandons the entire data of the video packet and practices concealment (step ST4) as in the case of having detected an error in step ST3.

On the other hand, in the case where no error is detected (step ST6 "No") and the motion marker contained in the next packet (AL-SDU) is detected (step ST7 "Yes"), the video decoding part 22 decodes the texture information contained in that packet (AL-SDU) (step ST8) and makes a check to see if a decoding error has been detected (step ST9).

In the case of FIG. 7, although an error has occurred in the decoding of the motion information and the macro block header in step ST5, the error is detected by step ST9 in the decoding of the texture information in step ST8.

To deal with this, according to this embodiment, when an error is detected by step ST9 in the decoding of the texture information in step ST8 (step ST9 "Yes"), the video decoding part 22 makes a check to determine which of the packet of motion information and macro block header information and the packet of texture information contains the error, based on the error-detection results 30 accompanying the packet of motion information and macro block header information and the packet of texture information, respectively (step ST10).

In the case where the error-detection result 30 received together with the packet of motion information and macro block header information indicates the presence of an error but the error-detection result 30 received along with the packet of the texture information indicates the absence of an error (step ST10 "Yes"), there is a strong possibility that an error occurred in the decoding of the motion information and the macro block header information although an error has been detected in the decoding of the texture information area as shown in FIG. 7.

In this instance, the video decoding part 22 provides to the compensated image generating part 44 the error detection flag 56 which indicates abandoning the entire data of the video packet (VP), that is, the motion information, the macro block header information and the texture information, and practicing concealment to generate a compensated image (step ST12).

In the case where the error-detection 30 received along with the packet of motion information and macro block header information indicates the absence of an error and the error-detection result received along with the packet of texture information indicates the presence of an error (step ST10 "No"), it is very likely that the motion information and the macro block header information decoded earlier than the motion marker are correct and that an error has occurred in the texture information area where an error was detected during decoding.

In such an instance, the video coding part 22 provides to the compensated image generating part 44 and the switching part 48 the error detection flag 56 which indicates that a predictive image obtained using the motion vector decoded earlier than the motion marker be used for concealment to compensate the decoded image for the error.

And, when the error detection flag 56 indicates that all pieces of the data contained in the video packets (VP), that is, the motion information, the macro block header information and the texture information, were abandoned in step ST12, the compensated image generating part 44 generates the compensated image 57 using information contained in the reference image. When the error detection flag 56 indicates that the motion information was decoded correctly in step ST11, the compensated image generating part 44 generates the compensated image 57 using the predictive image 55 that is provided from the switching part 48. The thus generated compensated image 57 is written in the memory 43 for use as a reference image in the next frame.

As described above, according to this embodiment, the coded video stream is broken down into packets each corresponding to a different data stream and each packet is transmitted together with an error detecting code. Accordingly, at the receiving side the presence or absence of an error in each data stream can be detected based on the error detecting code added to the data stream, and by performing concealment through the use of the error-detection result together with the position of an error detected during variable-length decoding, the coded video stream can be decoded with increased resistance to errors.

Embodiment 2

This embodiment (Embodiment 2) concerns modifications of the coded video stream packetizing part 6 and the MPEG-4 video decoding part 1 used in Embodiment 1.

Figure 9:
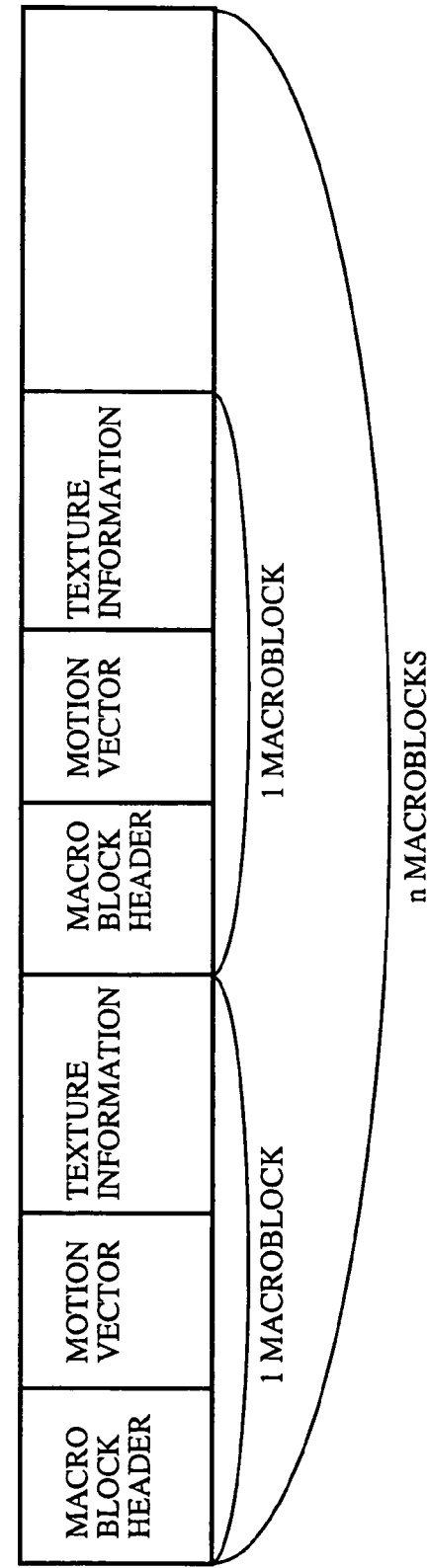
FIG. 9 is a diagram showing an example of macroblock data for use in a second embodiment of the present invention.

In this embodiment no particular limitations are imposed on the structure of the macro block data of the coded video stream that is output from the MPEG-4 video coding part 1. That is, the coded video stream shown in FIG. 3(*a*) may be the macro block data encoded using the data partitioning scheme defined by MPEG-4 as depicted in FIG. 3(*b*), or macro block data of a structure in which the macro block header, the motion information and the texture information are arranged for each of n macro blocks as depicted in FIG. 9. This embodiment does not impose any particular limitations on the macro block data structure as mentioned above, but the following description will be given on the assumption that the macro block data has the structure shown in FIG. 9.

The operation of the coded video stream packetizing part 6 in this embodiment will be described below.

The coded video stream packetizing part 6 inputs therein the coded video stream of the structure depicted in FIG. 3(*a*) and divides it into packets (AL-SDU) for processing in the multiplexing part.

FIG. 10 is a diagram for explaining how to map the coded video stream into the packets (AL-SDU) in this embodiment. As shown, the VOP start code and the VOP header, the macro block data, and the resynchronization marker and the VP header, all contained in the coded video stream, are mapped into single packets (AL-SDU), which are each added with control information and an error detecting code (CRC) to form a packet (AL-PDU).

When the macro block data is encoded using the data partitioning scheme as depicted in FIG. 3(*b*), it may be mapped as described previously with reference to FIG. 4. The macro block data may also be mapped into one packet, but in this embodiment the macro block data is mapped into two packets as shown in FIG. 10. Since the length of each packet (AL-SDU) is a multiple of 8 bits as is the case with Embodiment 1, information about the macro block data may sometimes be contained, for example, in the packet that contains the VOP start code and the VOP header. Though not shown in FIG. 10, the packet containing the resynchronization marker and the VP header is followed by a macro block header for the resynchronization maker and the VP header.

Next, the operation of the MPEG-4 video decoding part 22 in this embodiment will be described below on the assumption that a bit error is contained in the received coded video stream packetized as shown in FIG. 10.

FIG. 11 is a flowchart for explaining the decoding procedure of the video decoding part 22 in this embodiment.

The video decoding part 22 makes a check to determine whether the VOP start code is detected (step ST20), and if so (step ST20 "Yes"), decodes the VOP header information (step ST21), then decodes the macro block data of the next packet (AL-SDU) (step ST22), and at the same time makes a check to see if an error is detected in its decoding (step ST23). And, when an error is detected in the decoding of the macro block data (step ST23 "Yes"), the video decoding part 22 continues concealment of the macro block data until the next VOP start code or resynchronization marker is detected (step ST24).

On the other hand, in the case where no error is detected in the decoding of the macro block data (step ST23 "No") and the resynchronization marker of the next packet (AL-SDU) is detected (step ST25 "Yes"), the video decoding part 22 decodes the VP header information of that packet (step ST26) and makes a check to determined whether an error is detected in its decoding (step ST27).

And, when no error is detected in the decoding of the VP header information (step ST27 "No"), the video decoding part 22 decodes the macro block data of the next packet (AL-SDU) (step ST28), and makes a check to see if an error is detected in its decoding (step ST29). When an error is detected in the decoding of the macro block data (step ST29 "Yes"), the video decoding part 22 continues concealment of the macro block until the next VOP start code or resynchronization marker is detected (step ST30) as in the case of step ST24.

On the other hand, in the case where no error is detected in the decoding of the macro block data (step ST29 "No") and the next resynchronization marker is detected (step ST25 "Yes"), the video decoding part 22 decodes the VP header information of that macro block (step ST26) and makes a check to determine whether an error is detected in its decoding (step ST27).

Next, a description will be given, with reference to FIG. 12, of the case where an error is detected in step ST27 during the decoding of the VP header information in step ST26.

FIG. 12 shows, by way of example, the case where an error is detected in step ST27 during the decoding of the VP header information in step ST26.

Now, consider the case where an error is contained in the VOP start code. In order to detect the error earlier than the VOP start code and establish resynchronization, a search is made for the next VOP start code. Since the VOP start code to be detected is lost by the error as depicted in Fgi. 12, no VOP start code is detected and the next resynchronization marker is detected as the position of resynchronization; however, the VOP header and the macro block data between them is not decoded.

(1) When Header Extension Information is Contained in VP Header Information:

In the case where the VP header is decoded next and it contains header extension information as depicted in FIG. 12, the header extension information is compared with the VOP header information already decoded. In this case, since no VOP header has been decoded due to an error, the VOP header information for comparison is information of the preceding VOP header. Accordingly, in step ST27 an error that the header extension information and the VOP header information differ is detected during the decoding of the VP header information.

With the conventional MP+EG-4 video decoding part, however, it is difficult to decide whether the VOP header information is not correctly decoded or the header extension information is not correctly decoded due to an error.

In the MPEG-4 video decoding part 22 in this embodiment, concealment is carried out using the error-detection result that is input together with the packet of the coded video stream.

That is, in this embodiment, when an error that the VP extension information and the VOP header information do not match is detected in step ST27 during the decoding of the VP header in step ST26 (step ST27 "Yes"), the error-detection result received together with the packet of resynchronization marker and VP header information is checked to determine whether an error is contained in that packet (step ST31 "Yes").

In this instance, when the error-detection result indicates that no error is contained in the packet of the VP header information (step ST31 "Yes"), there is a strong possibility that the VOP start code has not been detected due to an error. Then, the header extension information (HEC), which is contained in the VP header information as depicted in FIG. 12, is used to practice concealment (step ST32), and decoding of the macro block data is resumed (step ST32).

On the other hand, when the error-detection result indicates the presence of an error in the packet of the VP header information (step ST31 "No"), the VP header information is incorrect; accordingly, the video decoding part 22 makes a search for the next resynchronization marker and abandons the coded string from that VP header information to the next resynchronization marker and practices concealment (step ST33).

(2) When No Header Extension Information is Contained in VP Header Information:

When no header extension information is contained in the VP header information in the error detection in step ST27, a check is made for an error by checking a macro block address contained in the VP header information. More specifically, a comparison is made between the macro block address of the video packet before resynchronization and the macro block address of the video packet detected after resynchronization; when the latter macro block address is smaller than the former, an error is detected.

With the conventional MPEG-4 video decoding part, it is difficult to decide whether no VOP start code has been detected or an error has occurred in the macro block address of the VP header. If it is decided in error that an error has occurred in the macro block address of the VP header, decoding is resumed at the point where the resynchronization marker of the video packet whose macro block address was larger than that of VP before resynchronization was detected. In this case, although the detected video packet is in VOP different from that before resynchronization, the decoded image is written in the same VOP as that of the video packet before resynchronization, seriously deteriorating the subjective picture quality.

In the MPEG-4 video decoding part 22 in this embodiment, when an error that the macro block address is smaller than the macro block address of the video packet decided before resynchronization is detected, the error-detection result received together with the packet of resynchronization and VP header information is checked. If the error-detection result indicates that there is no error, the possibility of the VOP start code having not been detected in error is stronger than the possibility of the macro block address of the VP header information having been decoded in error, and hence the coded string is resynchronized from the VOP start code of the current VOP to the next VOP start code r the resynchronization marker of the video packet that has the VP header containing the header extension information. With this technique, it is possible to avoid serious deterioration of the picture quality which would otherwise be caused by writing the VP data of a wrong video object plane (VOP) when no VOP start code is not detected.

(3) When Error is Detected in Macro Block Address Contained in VP Header:

Next, consider the case where an error is detected in the macro block address contained in the VP header. This situation arises when there is no continuity between the last macro block address of the immediately previously decoded video packet and the macro block address contained in its VP header (the macro block address at the head of the video packet). It is considered that, such discontinuity occurs in the two cases mentioned below.

Figure 13A:
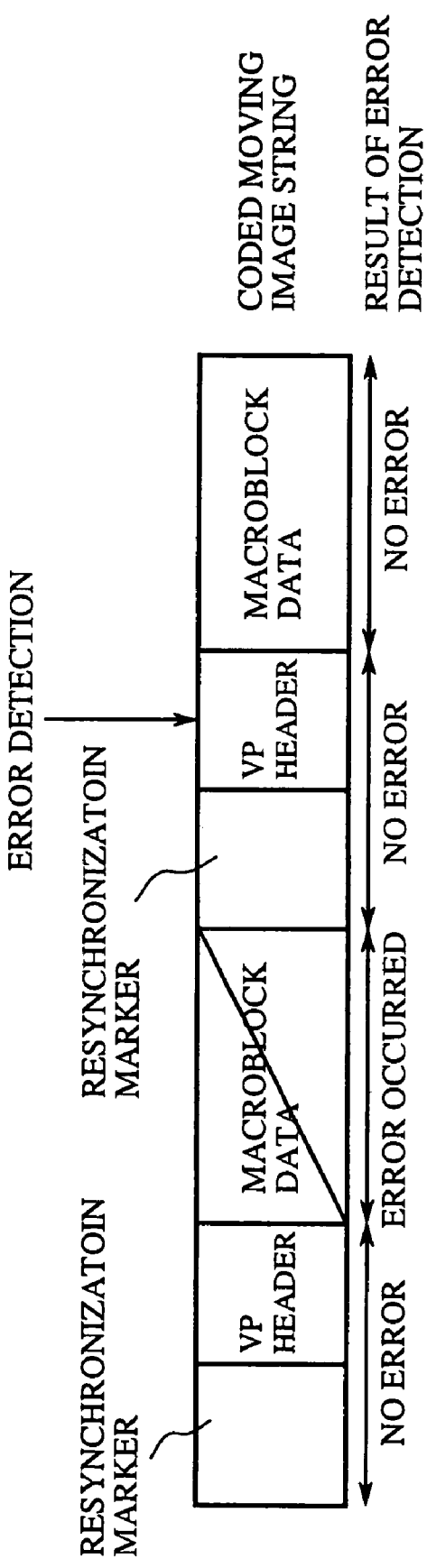
FIG. 13 is a diagram showing the detection of an error at the address of a macroblock contained in a VP header.

(1) When the macro block data decoded is wrong in number because of the occurrence of an error during decoding of the macro block data in the immediately preceding video packet (FIG. 13(a)).

Figure 13B:
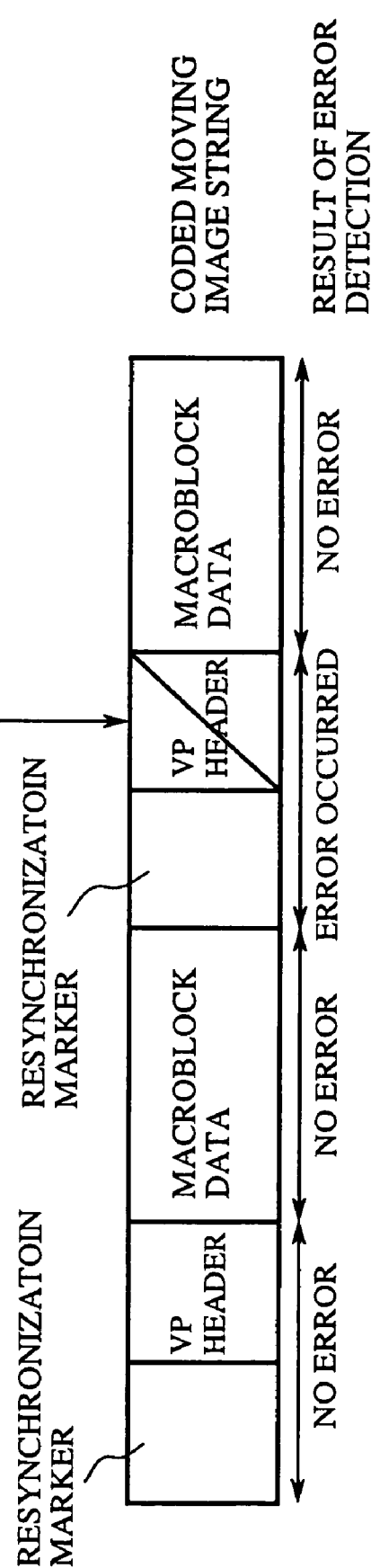

(2) When an error occurs in the macro block address of the VP header (FIG. 13(b)).

With the conventional MPEG-4 video decoding part, it is difficult to decide in which of the cases (1) and (2) the error is detected. If it is decided in error that the error is detected in the case (1) although it is actually in the case (2), concealment is carried out abandoning correctly decoded data of the immediately preceding video packet and decoding is resumed from the video packet having its macro block address decoded in error. In this case, a decoded image is written in the wrong macro block address, incurring a serious deterioration of the picture quality; furthermore, since the correctly decoded image data is also abandoned, the picture quality suffers a severe deterioration. In the opposite case, the VP data having correctly decoded VP header information is abandoned and VP header information decoded in error is written intact as a decoded image, also causing a serious deterioration in the picture quality.

In view of the above, the MPEG-4 video decoding part 22 according to this embodiment specifies the cause of the above-mentioned discontinuity between the macro block addresses through utilization of the error-detection result received along with the packet of resynchronization marker and VP header information as depicted in FIG. 10.

More specifically, when the error-detection result indicates the presence of an error, this means that an error is contained in the VP header, since the resynchronization marker has already been detected correctly. Accordingly, the possibility of case (2) is stronger than the case (1). Then, the next resynchronization marker or start code is searched and used as the position of resynchronization.

When the error-detection result does not indicate the presence of an error in the VP header, the possibility of the case (1) is stronger than the case (2). Then, concealment is practiced for the immediately preceding video packet and decoding is resumed at the VP header. With this technique, it is possible to prevent the above-mentioned severe deterioration of the picture quality experienced in the prior art when discontinuity arises in the macro block address contained in the VP header.

As described above, according to this embodiment, when the coded video stream is broken down into packets for processing in the multiplexing part, such unique codes for resynchronization as the VOP start code and the resynchronization marker and such header information such as the VOP header and the VP header are mapped into one packet, and such packets are each transmitted together with the error detecting code. Accordingly, at the receiving side is possible decide whether an error has occurred in the header information based on the unique codes for resynchronization and the error detecting code added to the header information, and by performing concealment through the use of the result of decision together with the position of error detected during variable-length decoding, the coded video stream can be decoded with increased resistance to errors.

Embodiment 3

This embodiment (Embodiment 3) is directed to another modification of the coded video stream packetizing part used in Embodiment 1.

The coded video stream packetizing part 6 in this embodiment is characterized in that the resynchronization marker, which is a particularly important one of the pieces of VP header information, and the macro block address are mapped into one packet (AL-SDU). That is, As referred to previously in Embodiment 2, the macro block address contained in the VP header information represents absolute position information of the macro block at the head of the video packet. Accordingly, when the macro block address is wrong, the decoded macro block is placed at a wrong position in the picture, resulting in the decoded image suffering a serious deterioration in image quality. To avoid this, in the coded video stream packetizing part 6 according to this embodiment, the resynchronization marker in the VP deader information and the macro block address are mapped into one packet (AL-SDU).

In such an instance, the MPEG-4 video decoding part 22 in this embodiment receives the packet of resynchronization marker and macro block address, together with an error-detection result indicating the presence or absence of an error in the packet. In the decoding process, if the error-detection result indicates the presence of an error when the resynchronization marker is decoded, it indicates the occurrence of an error in the macro block address. Then, in this embodiment the video packet concerned is abandoned and resynchronization is started at the next video packet, by which it is possible to prevent a serious deterioration of the picture quality which would caused by placing the decoded image at a wrong position in the picture.

Embodiment 4

This embodiment is directed to a multimedia communication system which is characterized in that the packet generation and the media multiplexing rate in the transmitting apparatus are controlled based on the result of error detection in the receiving apparatus.

Figure 14:
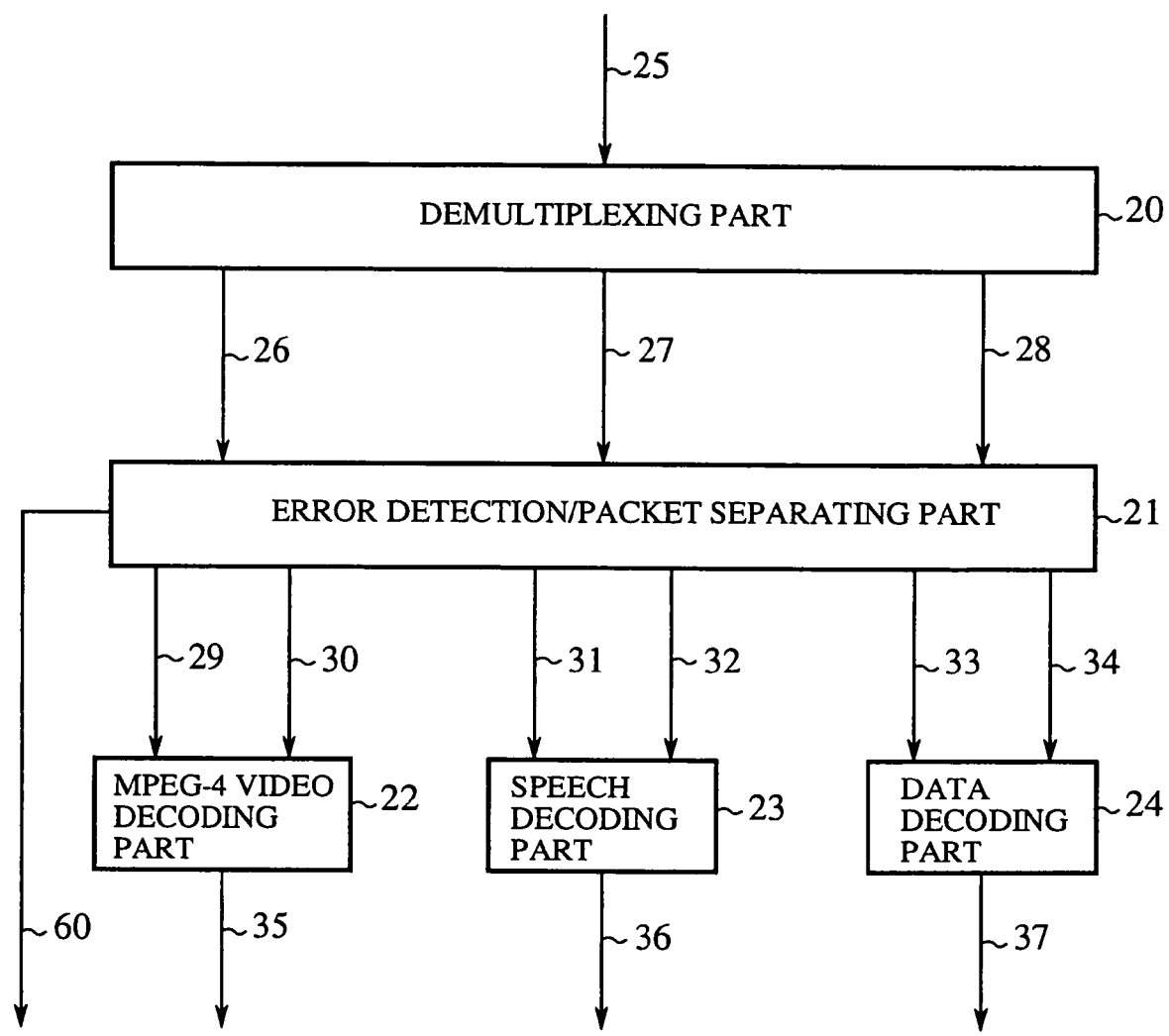
FIG. 14 is a block diagram illustrating the configuration of a receiving device of a multimedia communication system according to a fourth embodiment of the present invention.

FIG. 14 illustrates in block form the receiving apparatus of the multimedia communication system according to this embodiment. The parts corresponding to those in the receiving apparatus of Embodiment 1 shown in FIG. 5 are identified by the same reference numerals, and no description will be repeated in connection with them. Reference numeral 60 denotes the result of error detection.

Figure 15:
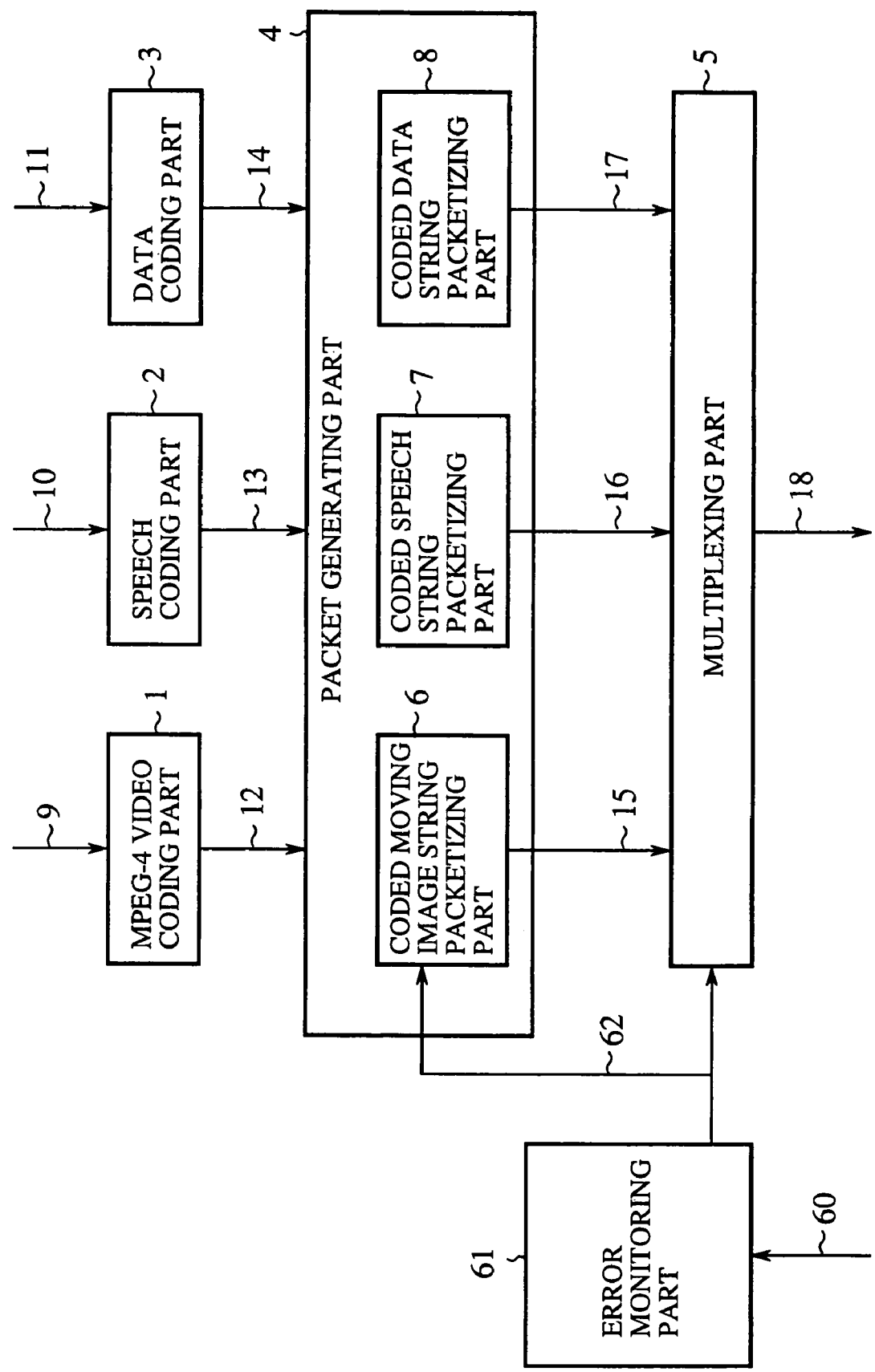
FIG. 15 is a block diagram illustrating the configuration of a transmitting device of a multimedia communication system according to the fourth embodiment.

FIG. 15 illustrates in block form the transmitting apparatus of the multimedia communication system according to this embodiment. The parts corresponding to those in the transmitting apparatus of Embodiment 1 shown in FIG. 2 are identified by the same reference numerals, and no description will be repeated in connection with them. Reference numeral 60 denotes the result of error detection which is provided from the error detection/packet separation part 21 of the receiving apparatus; 61 denotes an error monitoring part; and 62 denotes an error rate.

Next, the operation of this embodiment will be described below.

In the receiving apparatus side of FIG. 14, the packet separation/error detection part 21 sends, as the result of error detection 60 in the receiving apparatus, the result of error detection 30 made in the video packet (the coded video stream), the result of error detection 32 in the speech packet (the coded speech stream) and the result of error detection 34 made in the data packet (the coded data stream) to the transmitting apparatus side.

In the transmitting apparatus side of FIG. 15, the error monitoring part 61 monitors the error-detection result 60 sent from the receiving side, and provides the error rate 62 in the receiving apparatus to the packet generating part 4 and the multiplexing part 5.

In the packet generating part 4 the packet assembling scheme is changed according to the error rate 62 provided from the error monitoring part 61. For example, when the error rate is high, a packet assembling scheme of high error resistance is used because of a channel condition under which a transmission error is likely to occur. Concretely, the start code and the header information are mapped as one packet as described previously in respect of Embodiments 1 and 2 (see FIGS. 4 and 10). In a channel of a higher error rate, the motion information and the texture information are mapped as different packets as referred to previously with respect to Embodiment 1 (see FIG. 4), by which the error resistance can be increased. On the other hand, in a channel of a low error rate, since a transmission error is not likely to occur, for example, the video packet is mapped intact as one packet, or plural video packets is mapped as one packet, by which it is possible to reduce the redundancy resulting from the packet generation.

In the multiplexing part 5, the pattern of the multiplexed packet into which various media packets from the packet generating part 4 are multiplexed is changed in accordance with the error rate 62 which is provided from the error monitoring part 61.

Figure 16:
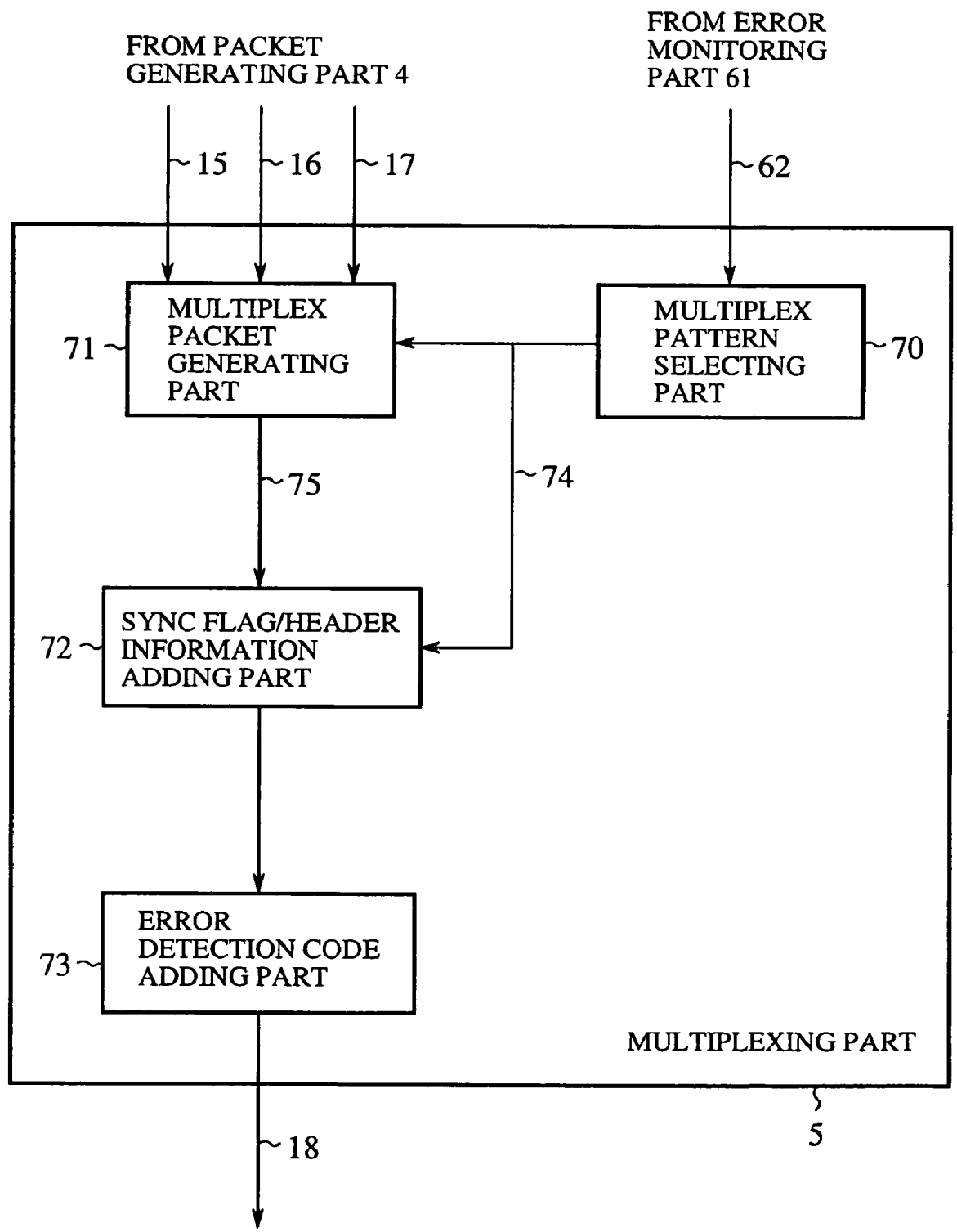
FIG. 16 is a block diagram illustrating the configuration of a multiplexing part 5 according to the fourth embodiment.

FIG. 16 illustrates in block form the multiplexing part 5 in this embodiment. Reference numeral 70 denotes a multiplexing pattern selecting part; 71 denotes a multiplexed packet generating part; 72 denotes a sync flag/header information adding part; 73 denotes an error detecting code adding part; 74 denotes a multiplexing pattern; and 75 denotes a multiplexed packet. Reference numeral 62 denotes the error rate which is provided from the error monitoring part 61.

Next, the operation of the multiplexing part 5 shown in FIG. 16 will be described below.

In the first place, based on the error rate 62, the multiplexing pattern selecting part 70 selects one multiplexing pattern 74 from a table in which there are defined plural multiplexing patterns. The multiplexing pattern has defined therein information according to which, for example, only the media packet of speech is rendered into one multiplexed stream, or only the media packet of vide is rendered into one multiplexed stream, or packets into which media packets of speech and video are multiplexed at a predetermined ratio between them are rendered into one multiplexed stream. With this definition, it is also possible to divide the video media packet (MUX-SDU) into plural elements and render them into different multiplexed streams.

For example, in a channel of a high error rate, the rate of the video media packet contained in one multiplexed stream is decreased. That is, the media packet of video is divided into plural elements so that they are contained in as many multiplexed streams as possible. The reason for this is that the influence of an error in video is large; especially in the case where every piece of information in one video packet are abandoned due to a burst error, various error tools adopted by MPEG-4 cannot effectively be used. To prevent this, the rate of the media packet of video in one multiplexed stream is reduced so that errors will not occur intensively in one video packet.

For a channel of a low error rate, many pieces of information are rendered into one multiplexed stream with a view to reducing the redundancy that is attributable to the header information of the multiplexed stream.

The multiplexing pattern 74 selected in the multiplexing pattern selecting part 70 is sent to the multiplexed packet generating part 71 and the sync flag/header information adding part 72. Based on the multiplexing pattern 74, the multiplexed pattern generating part 71 assembles the packet 15 of the coded video stream, the packet 16 of the coded speech stream and the packet 17 of the coded data stream into one multiplexed packet 75. The multiplexed packet 75 is added with a sync flag and header information in the sync flag/header information adding part 72. The multiplexing pattern 74 selected in the multiplexing pattern selecting part 70 is multiplexed as the header information. In the error detecting code adding part 73 the multiplexed packet 75 is added with an error detecting code to make the header information error-resistant, thereafter being output as the multiplexed stream 18.

As described above, according to this embodiment, the packet assembling scheme in the packet generating part 4 is chosen according to the error rate, by which it is possible to implement the packet generation with increased error resistance when the error rate is high and to reduce the redundancy by the packet generation when the error rate is low.

Furthermore, the media multiplexing rate in the multiplexing part 5 is changed according to the error rate; when the error rate is high, the media packet of video is divided to reduce the rate of the media packet of video contained in one multiplexed stream so that errors will not occur intensively in one video packet—this provides increased error resistance.

Embodiment 5

Figure 17:
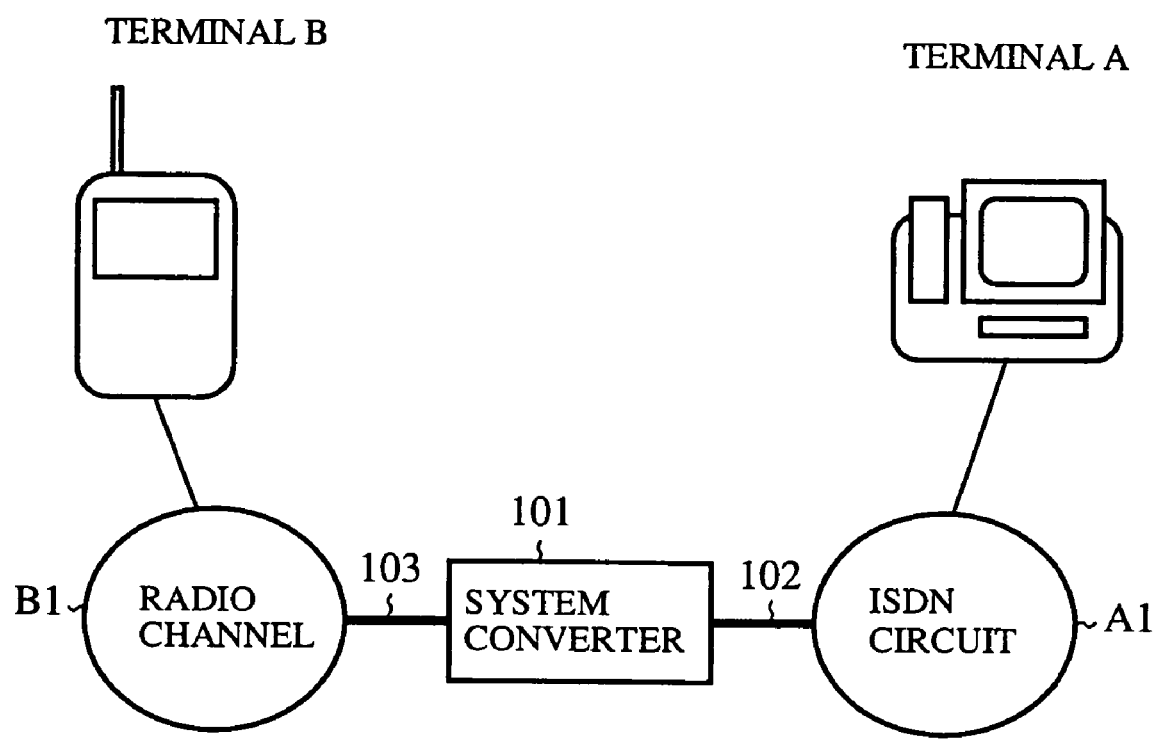
FIG. 17 is diagram showing a system in which a bet stream converter according to a fifth embodiment is intended to use.
Figure 18:
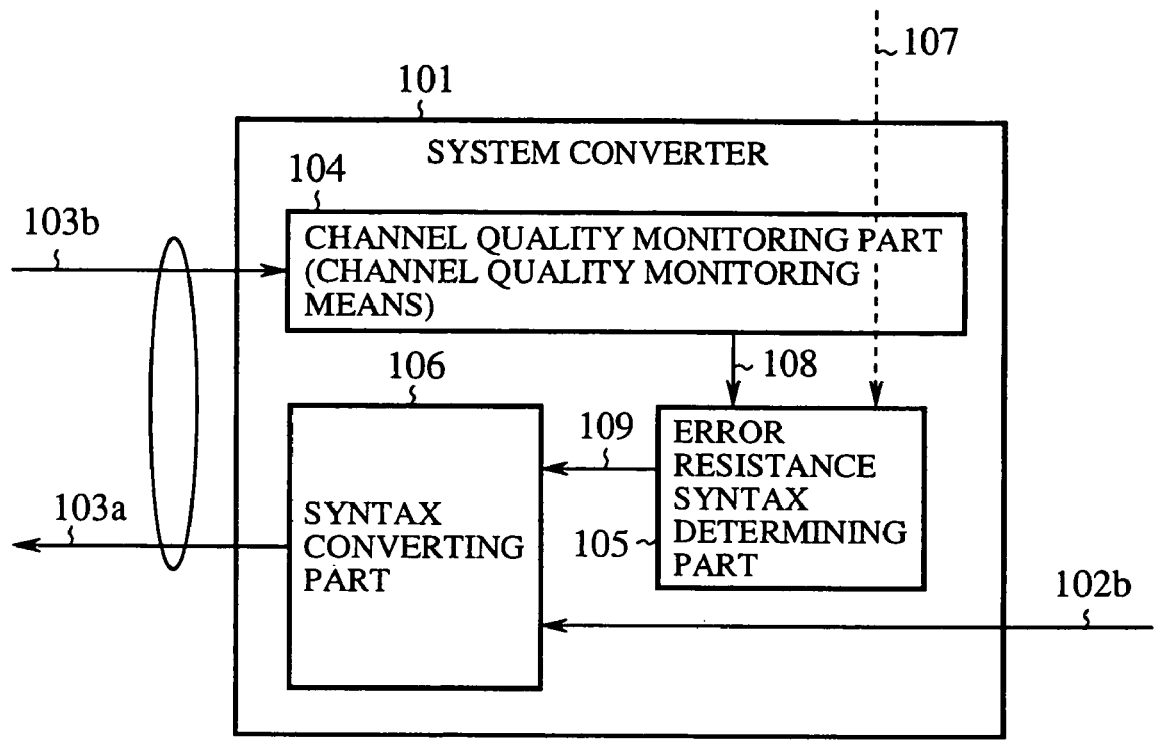
FIG. 18 is a block diagram illustrating the internal configuration of the bit stream converter according to the fifth embodiment.

FIG. 17 is a diagram depicting the configuration of a system to which a bit stream converter according to a fifth embodiment (Embodiment 5) of the present invention. A description will be given of a system that carries out moving image transmissions between a terminal A connected to an ISDN circuit A1 and a multimedia terminal B connected to a radio channel B1. Reference numeral 101 denotes a system converter for converting the video coding scheme mutually between the terminal A and the multimedia terminal B in the case where the former is the transmitting side and the latter the receiving side. Reference numeral 102 denotes a bit stream (a second bit stream) coded by H. 263 as a multimedia multiplexed stream packetized by an ISDN media multiplexing system such as ITU-TH. 221. Reference numeral 103 denotes a bit stream (a first bit stream) coded by MPEG-4 as a multimedia multiplexed stream packetized by a media multiplexing system for radio channel use such as ITU-TH. 223. As depicted in FIG. 18, the coded bit stream 103 is composed of an up-link MPEG-4 coded bit stream 103a and a down-link MPEG-4 coded bit stream 103b.

Incidentally, there are some pieces of other media information such as those of audio information accompanying moving images, respectively, these pieces of multimedia information are sent as one multiplexed stream to the channel. The following description will be given, for brevity sake, on the assumption that only pieces of coded video data are multiplexed by a media multiplexing system predetermined for each channel.

Figure 19:
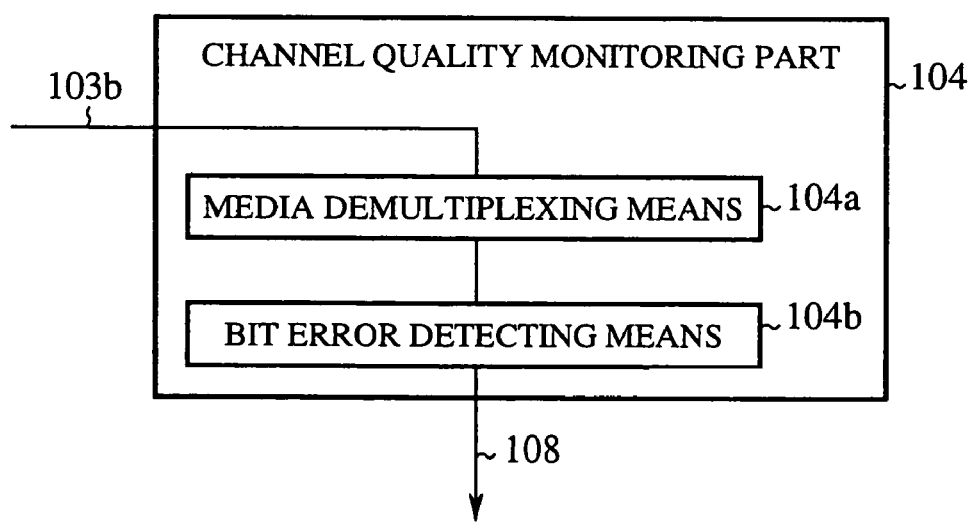
FIG. 19 is a block diagram showing the internal configuration of a channel quality monitoring part of the bit stream converter according to the fifth embodiment.

FIG. 18 illustrate in block form the internal configuration of the bit stream converter according to this embodiment, and FIG. 19 illustrates in block form the internal configuration of a channel quality monitoring part of the bit stream converter. Reference numeral 104 denotes a channel quality monitoring part (channel quality monitoring means) for monitoring the error status of the radio channel B1. The channel quality monitoring pat 104 comprises: media demultiplexer means which receives the down-link MPEG-4 coded bit stream 103b and demultiplexes it into media multiplexing packets (AL-PDU) which are to be converted; and bit error detecting means 104b which makes a check to see if bit errors are contained in a CRC field added to each packet separated by the media demultiplexing means 104a (which CRC field is a fixed-length bit generated using data in the packet), counts the number of bit errors, calculates an average error rate at predetermine time intervals based on the error count value, and outputs it as an internal signal 108 to an error resistance syntax determining part 105.

Reference numeral 105 denotes an error resistance syntax determining part, which: receives from the channel quality monitoring part 104 the internal signal 108 indicating the error rate; selects, in accordance with the error rate, MPEG-4 error resistance syntaxes to be standardized, one by one or in combination of them, by the ISO described below; reads therein from an external device an error resistance syntax changing period 107 which determines the timing for changing the error resistance syntax according to the channel condition; and, based on the error resistance syntax changing period 107, outputs the error resistance syntax selection result 109 to a syntax converting part 106.

By the error resistance syntax changing period 107 set to one frame, for example, it is possible to change the error resistance syntax every other frame. If the changing period 107 is set to 15 frames, the error resistance syntax can be changed at intervals of 15 frames. While in the above the error resistance syntax changing period 17 has been described to be set to an arbitrary number of frame from the outside, the system converter 101 can also be configured as to select a syntax in disregard of the set value when the given period is not appropriate, for example, at the instant the error rate undergoes an extreme variation.

Reference numeral 106 denotes a syntax converting part, which, when supplied with the error resistance syntax selection result 109 from the error resistance syntax determining part 105, converts the syntax of the down-link H. 263 coded bit stream 103b to the syntax of the up-link MPEG-4 coded bit stream 103a. The conversion of syntax in the syntax converting part 106 corresponds to processing by which: a bit stream encoded by the H. 263 coding scheme is once analyzed in a coded data area; the bits are converted into a bit string based on the definition of the MPEG-4 syntax; and, based on the selected error resistance syntax, the bit stream is used to reconstruct the syntax of the MPEG-4 video coded bit stream. This syntax conversion involves various processes, but they falls outside the scope of the present invention.

Next, a description will be given of four MPEG-4 error resistance syntaxes to be standardized by ISO. In MPEG-4 the following four error resistance syntaxes are supported at the level of the video coded bit stream syntax.

(1) Video Packet Structure (First Error Resistance Syntax)

Figure 20:
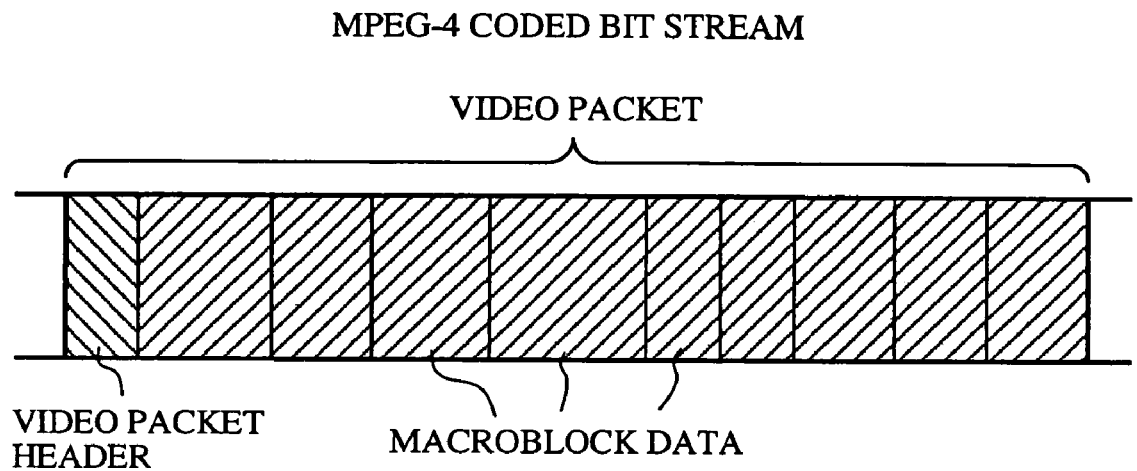
FIG. 20 is a diagram depicting the structure of an MPEG-4 video packet.

FIG. 20 is a diagrammatic showing of the MPEG-4 video packet structure. As shown, the video packet structure is a data unit which is composed of a video packet header and macro block data contained in a bit stream that immediately follows the video packet header and continues to a point immediately preceding the next video packet header. The video packet header, which begins with the resynchronization marker (a unique word for resynchronization), can be inserted in the bit stream at an arbitrary position. Hence, by inserting resynchronization markers in the bit stream at equal bit length intervals, it is possible to facilitate the detection of their positions and suppress deterioration of the picture quality in an area of an abrupt motion.

(2) HEC Field (Fourth Error Resistance Syntax)

This is a video packet multiplexing scheme which optionally inserts important information of the VOP header in the video packet header. With this scheme, it is possible, for instance, to continue decoding through the use of information in an HEC field even if the reliability of the decoding status of a high order layer such as the VOP header is low. Incidentally, VOP is an abbreviation for "video object plane," which is adapted so that a video sequence can be encoded for each object of an arbitrary form (such as a man or background); VOP corresponds to the frame or picture which is a time sampling unit of the conventional image encoding scheme. The frame and the picture are each regarded as special VOP which is rectangular and does not change its size with time.

(3) Data Partitioning (Second Error Resistance Syntax)

Figure 21:
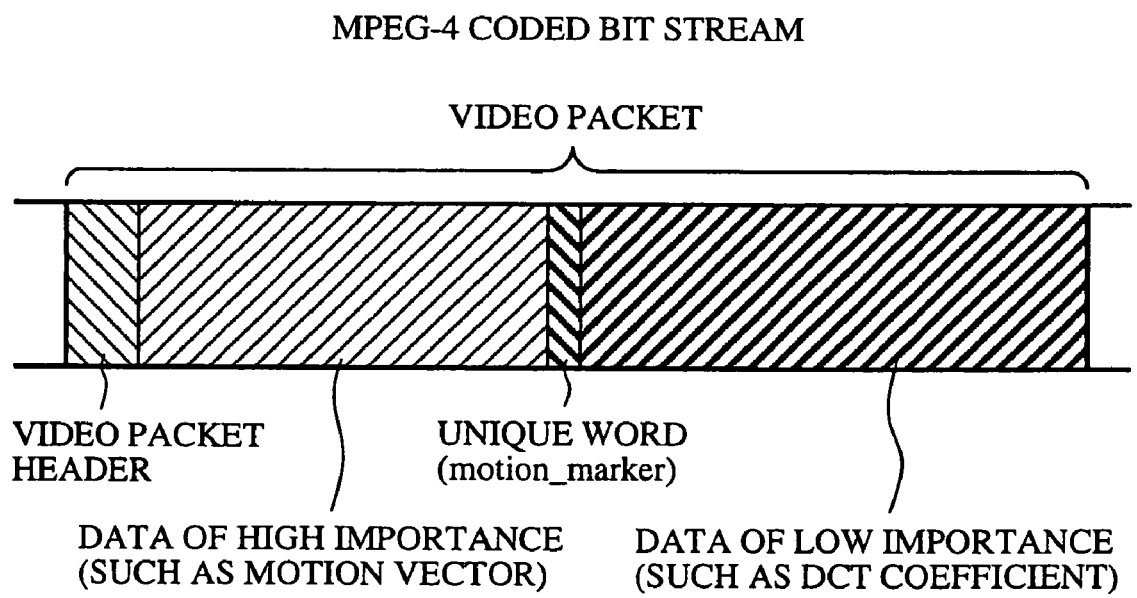
FIG. 21 is a flowchart showing an MPEG-4 data partitioning syntax.

FIG. 21 is a diagrammatic representation of an MPEG-4 data partitioning syntax. This syntax is one that partitions the macro block data contained in the video packet into data of major importance (such as the motion vector) and data of minor importance (such as DCT coefficient data) and encodes them separately. As depicted in FIG. 21, the unique word is interposed between the data of major importance and the data of minor importance, by which the boundary between the two data areas can be detected. This makes it possible for the decoding side to effectively perform error concealment by using the data of major importance when an error is detected in the data of minor importance.

(4) Reversible VLC (Third Error Resistance Syntax)

This syntax is one that is predicated on the data partitioning syntax and that encodes a variable-length code of DCT coefficient data multiplexed on the data of minor importance through the use of uniquely reversible VLC. In the data area encoded using the reversible VLC, even if an error is detected, error-free data can normally be decoded by decoding the data area in the opposite direction.

These error resistance syntaxes can be flexibly selected in combination, except mutually dependent relationships between the syntaxes (1) and (3) or between (3) and (4). As the result of the syntax selection, a syntax path changes accordingly. In general, an increase in the number of such functions provides increased error resistance. However, this entails such disadvantages as follows: in the case of (1), a decrease in the transmission efficiency for the video packet header; in the case of (2), a decrease in the transmission efficiency for the HEC field; in the case of (3), an increase in the number of memories needed during decoding; and in the case of (4), decreased transmission efficiency by the reversible VLC as compared with the transmission efficiency by normal VLC.

Accordingly, the system converter 101 in this embodiment provides a bit stream syntax that increases the transmission efficiency when the error rate of the radio channel B1 is low and, when the error rate is high, becomes robust against errors even at the price of the transmission efficiency.

Next, the operation of the converter 101 will be described below.

Figure 22:
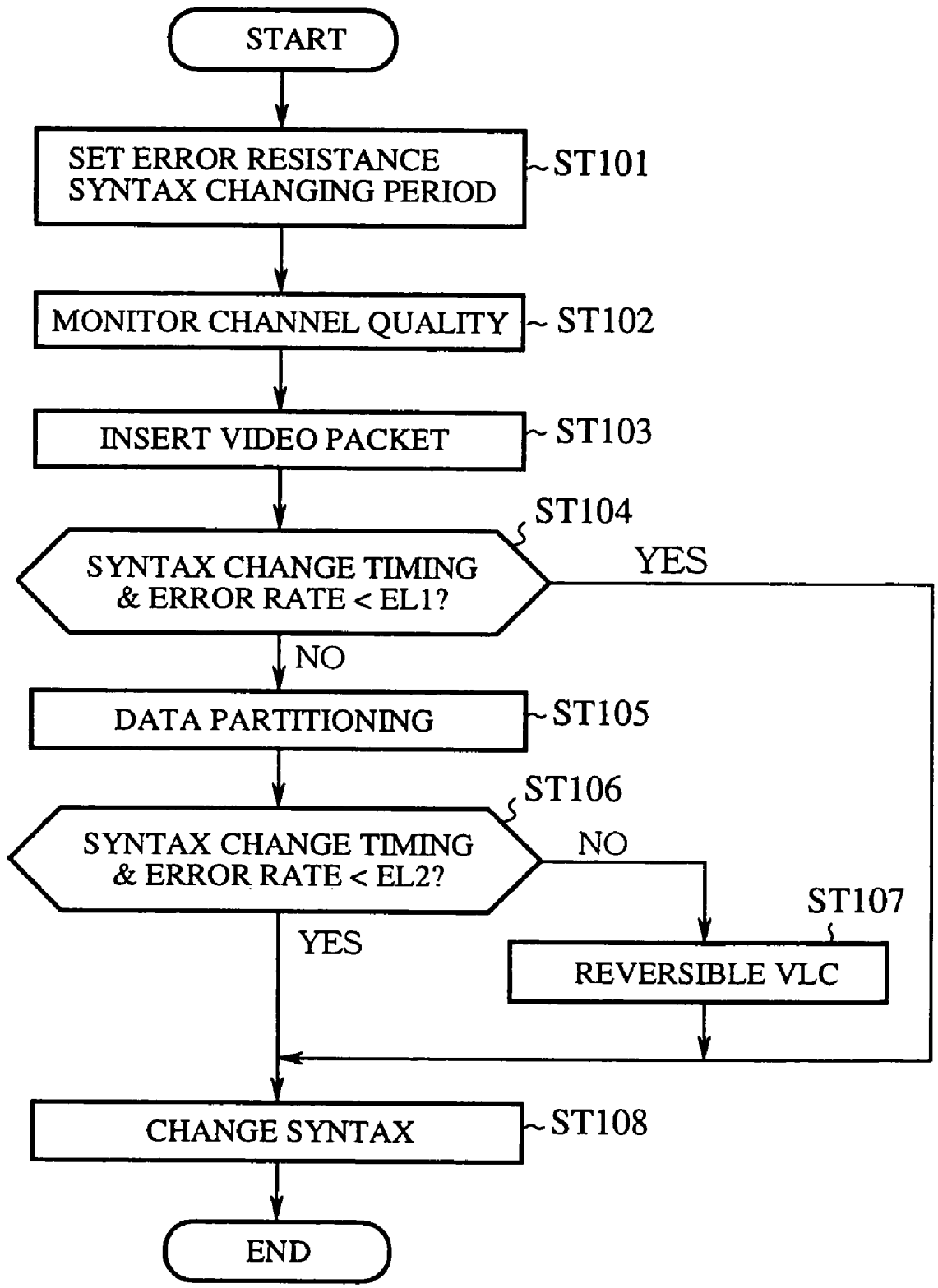
FIG. 22 is a flowchart showing the operation procedure of the bit stream converter according to the fifth embodiment.

FIG. 22 is a flowchart showing the operation procedure of the bit stream converter according to Embodiment 5 of the present invention.

In the first place, the system converter 101 sets in the error resistance syntax determining part 105 the error resistance syntax changing period 107 read from an external device (step ST101). Then, the channel quality monitoring part 104: receives the down-link MPEG-4 coded bit stream 103b via the radio channel B1; separates it into packets (AL-PDU) for media multiplexing to be converted; makes a check to see if a bit error is contained in the CRC field added to each packet, and counts the number of bit errors; calculates an average error rate at predetermined time intervals based on the bit error count value; and outputs the average error rate as the internal signal 108 to the error resistance syntax determining part 105 (step ST102).

Next, the error resistance syntax determining part 105 inserts video packets as the minimum error resistance syntax required to cope with the condition of the radio channel B1 (step ST103). When the radio channel B1 is in good condition, there are cases where the error resistance syntax determining part 105 does not insert any video packets or reduces the number of video packets to be inserted. The coded moving image bit stream 102 (H. 236 coded bit stream) can be added with one resynchronization marker for each unit GOB (Group OF Block). Since GOB is always fixedly positioned on the video plane, it is impossible to insert the resynchronization marker in accordance with the property or error characteristic of the image. The video packet insertion may also be done by converting the resynchronization marker of GOB to the resynchronization marker of the video packet without changing its position.

Next, at the instant of the syntax change timing based on the error resistance syntax changing period 107, the error resistance syntax determining part 105 makes a check to determine whether the channel error rate is lower than a predetermined threshold value EL1 (step ST104). In the case of "YES," that is, if the error rate is lower than the threshold value EL1, the H. 263 MPEG-4 coded bit stream 102 is converted to the MPEG-4 coded bit stream 103 without using any error resistance syntaxes (step ST108). In the case of "NO," that is, when the channel error rate is higher than the predetermined threshold value EL1, the data partitioning syntax is used (step ST105) and the H. 263 coded bit stream 102 is converted to the MPEG-4 coded bit stream 103.

Next, at the instant the syntax change timing based on the error resistance syntax changing period 107, a check is made to see if the channel error rate is lower than a predetermined threshold value EL2 (which is smaller than EL1) (step ST106). In the case of "YES," that is, when the error rate is lower than the threshold value EL2, the H. 263 coded bit stream 102 is converted to the MPEG-4 coded bit stream 103 without using other error resistance syntaxes (step ST108). On the other hand, in the case of "NO," that is, when the channel error rate is higher than the threshold value E12, the error resistance needs to be increased; then, the reversible VLC is used (step ST107) and H. 263 coded bit steam 102 is converted to the MPEG-4 coded bit stream 103 (step ST108).

Another method of operation of the system converter 101 will be described below.

Figure 23:
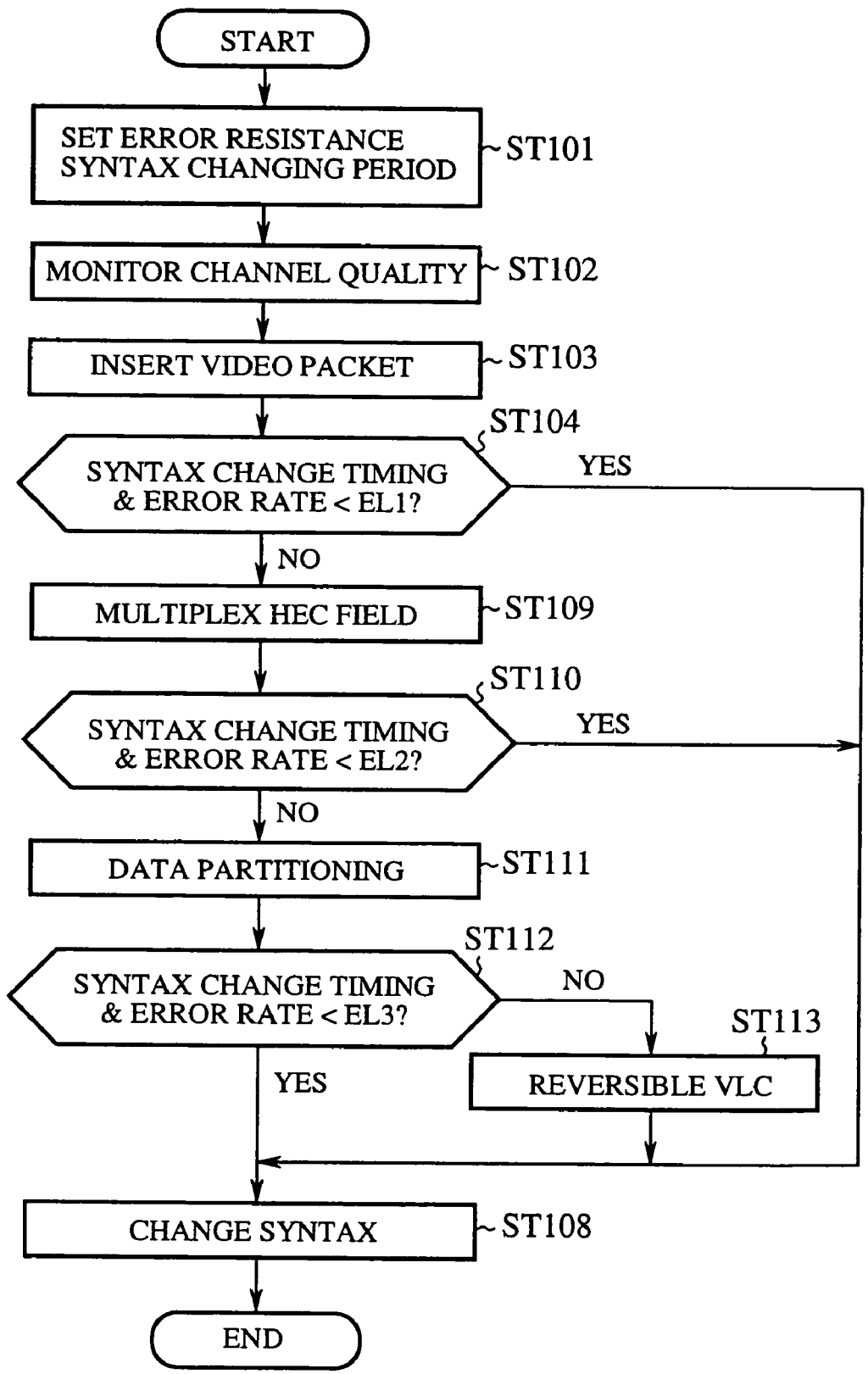
FIG. 23 is a flowchart showing another operation procedure of the bit stream converter according to the fifth embodiment.

FIG. 23 is a flowchart showing another operation procedure of the bit stream converter according to Embodiment 5. Steps ST101 to ST104 are the same as those in FIG. 21, and hence no description will be given of them. In the case of "NO" in step ST104, that is, when the channel error rate is higher than the predetermined threshold value EL1, the syntax of the HEC field is adopted (step ST109) and the H. 263 coded bit stream 102 is converted to the PMEG-4 coded bit stream 103.

Next, at the instant the syntax change timing based on the error resistance syntax changing period 107, a check is made to determine whether the channel error rate is lower than the predetermined threshold value EL2 (step ST110). In the case of "YES," that is, when the channel error rate is lower than the threshold value EL2, the H. 263 coded bit stream 102 is converted to the MPEG-4 coded bit stream 103 without using any other error resistance syntaxes (step ST108). On the other hand, in the case of "NO" in step ST 110, that is the channel error rate is higher than the threshold value EL2, the error resistance needs to be increased; then, the data partitioning syntax is adopted (step ST111) and the H. 263 coded bit stream 102 is converted to the MPEG-4 coded bit stream 103.

Following this, at the instant of the syntax change timing based on the error resistance syntax changing period 107, a check is made again to determine whether the channel error rate is lower than a predetermined threshold value EL3 (which is larger than EL2) (step ST112). In the case of "YES," that is, when the channel error rate is lower than the threshold value EL31, the H. 263 coded bit stream 102 is converted to the MPEG-4 coded bit stream 103 without using any other error resistance syntaxes (step ST108). On the other hand, in the case of "NO" in step ST112, that is, when the channel error rate is higher than the threshold value EL3, the error resistance needs to be increased; then, the reversible VLC is adopted (step ST113) and the H. 263 coded bit stream 102 is converted to the MPEG-4 coded bit stream 103 (step ST108).

Still another method of operation of the system converter 101 will be described below.

Figure 24:
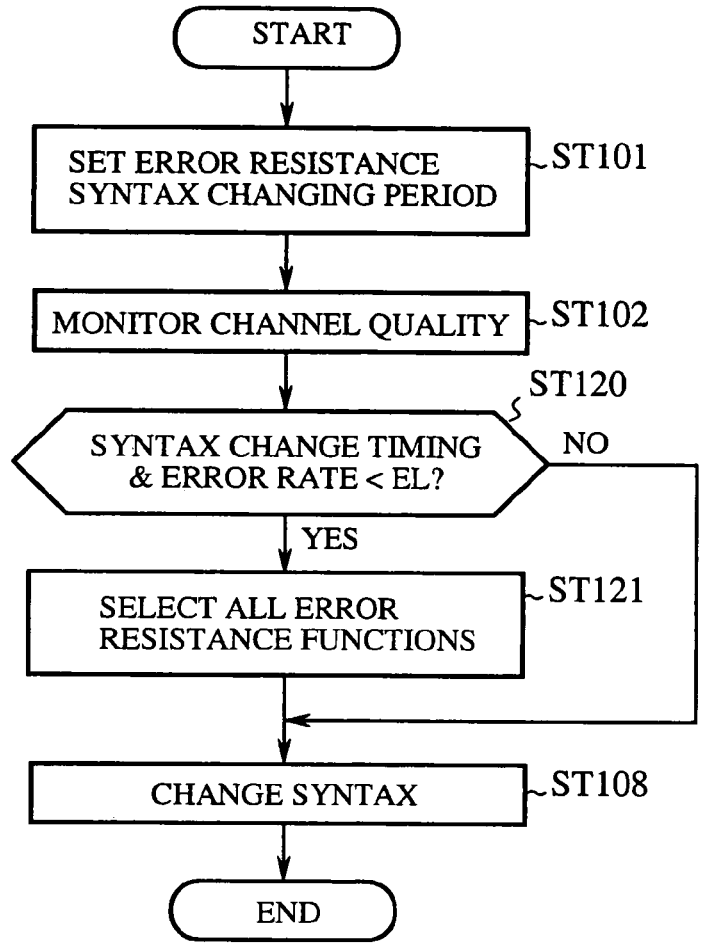
FIG. 24 is a flowchart showing still another operation procedure of the bit stream converter according to the fifth embodiment.

FIG. 24 is a flowchart showing another operation procedure of the bit stream converter according to Embodiment 5. The steps ST101, 102 and 108 are the same as those in FIG. 22, and hence no description will be given of them. At the instant of the syntax change timing based on the error resistance syntax changing period 107, the error resistance syntax determining part 105 makes a check to see if the channel error rate is higher than a predetermined threshold value EL (step ST120; in the case of "YES," that is, when the error rate is higher than the threshold value, all the error resistance syntaxes (step ST121) are selected and the H. 263 coded bit string 102 is converted to the MPEG-4 coded bit stream 103 (step ST108). On the other hand, in the case of "NO" in step ST120, that is, when the channel error rate is lower than the predetermined threshold value EL, the H. 263 coded bit stream 102 is converted to the MPEG-4 coded bit stream 103 (step ST108) without using any error resistance syntaxes.

As described above, this embodiment is provided with the channel quality monitoring part 104 which implements channel quality monitoring means and the error resistance syntax determining part 105 which implements syntax rule decision means; hence it is possible to provide an efficient bit stream according to the channel condition while achieving a balance between the degree of error resistance of the moving image coded bit stream to be fed over a channel of high error rate and the transmission efficiency as a whole. This embodiment is particularly effective in implementing moving picture communications between the communication terminal connected to the radio channel which supports the MPEG-4 video and the communication terminal connected to the ISDN or existing public network which supports the ITU-TH. 263 video.

Incidentally, the system converter 101 according to this embodiment performs conversion for the moving image coded bit stream, and hence it produces the same effects as described above even when the terminal A is an H. 324 terminal assumed to be connected to an ordinary analog public network or ISDN circuit based on H. 263, or an H. 323 terminal assumed to be connected to the Internet.

Embodiment 6

Figure 25:
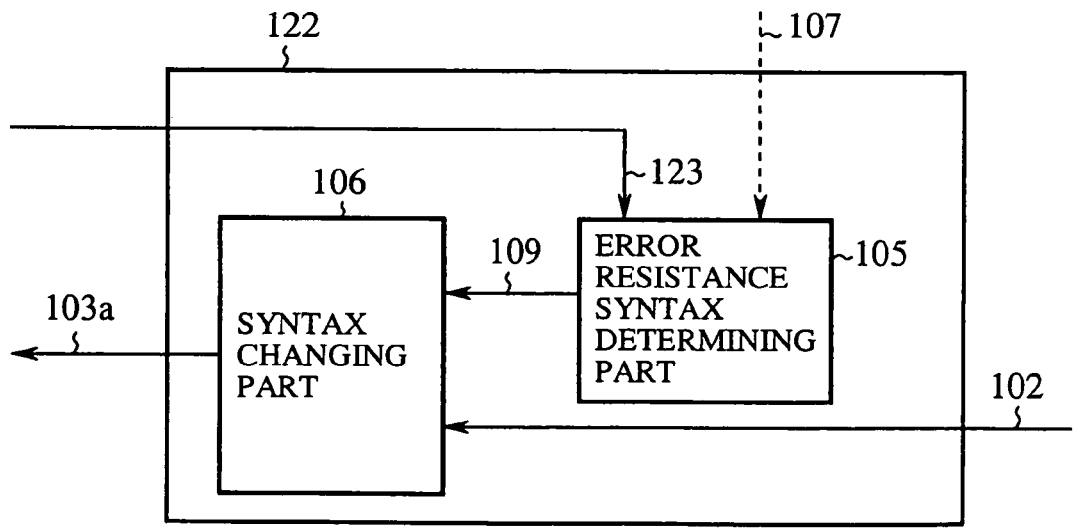
FIG. 25 is a block diagram depicting the internal configuration of a bit stream converter according to a sixth embodiment of the present invention.
Figure 26:
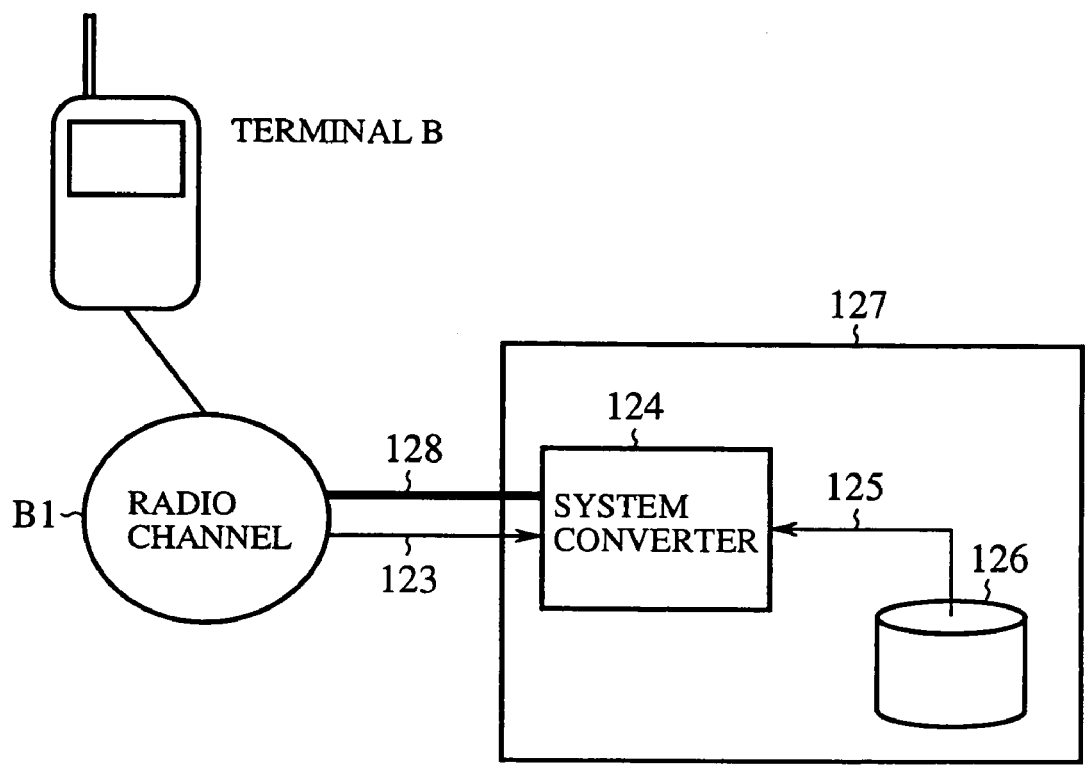
FIG. 26 is a block diagram depicting the internal configuration of a bit stream converter according to a seventh embodiment of the present invention.

FIG. 26 is a block diagram illustrating the internal configuration of a bit stream converter according to a sixth embodiment (Embodiment 6) of the present invention. The same parts as those in Embodiment 5 are identified by the same reference numerals and no description will be repeated. While Embodiment 5 is adapted to detect the channel error rate of the system converter 101 itself by the channel quality monitoring part 104, the error rate may also be entered from the outside of the system converter 101. This could be implemented using, for example, a system configuration in which the network itself monitors the quality of service (QoS). In such an instance, it is possible to employ a device configuration which dispenses with the channel quality monitoring part 104 in FIG. 18 but instead enters the error rate 123 from the outside as in a system converter 122 of FIG. 25.

As described above, this embodiment is adapted to perform processing based on the error rate 123 which is input from the outside; hence, the same effect as is obtainable with Embodiment 5 can be produced without monitoring the channel quality by the converter itself.

Embodiment 7

FIG. 26 is a block diagram illustrating a bit stream converter according to a seventh embodiment (Embodiment 7) of the present invention. This embodiment will be described in connection with a system converter which is contained in a media server which stores multimedia contents and delivers the contents in response to a request. Reference numeral 125 denotes contents stored as a video coded bit stream in a storage 126. Assume that the contents include bit streams encoded offline by an extremely high-quality processing system, or bit streams created on the premise that they are transmitted over a high-quality channel virtually in susceptible to errors. That is, assume that the contents 125 contains no particular syntax for error resistance. Reference numeral 127 denotes a media server provided with a system converter 124 which converts the contents 125 to those 128 for transmission over the radio channel B1.

Next, the operation of this embodiment will be described below.

Figure 27:
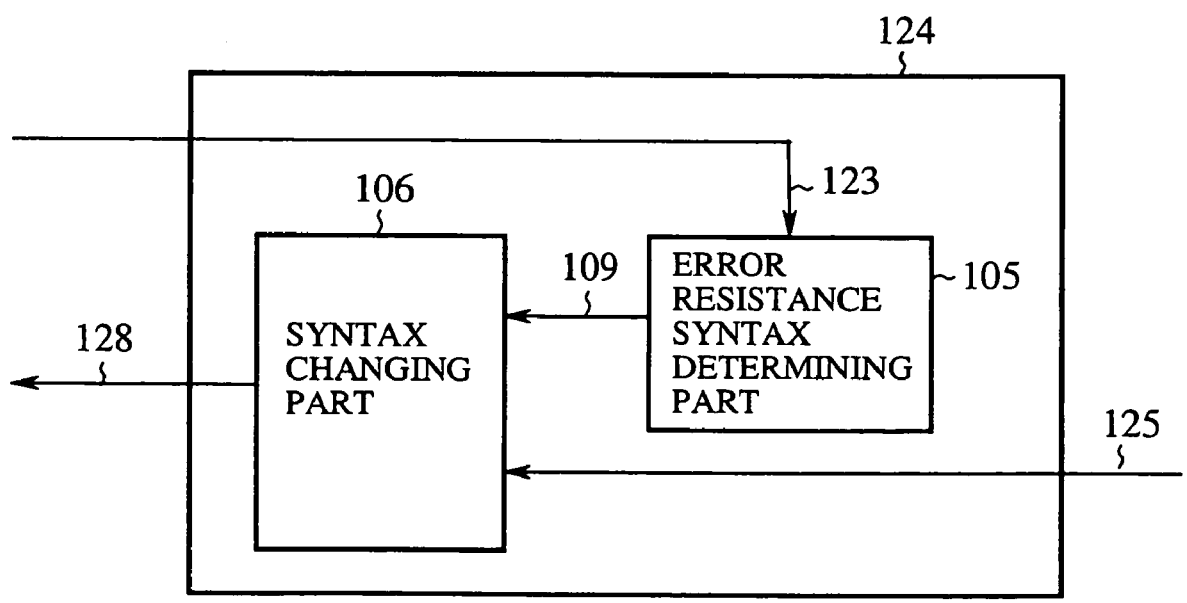
FIG. 27 is a block diagram illustrating the internal configuration of a system converter in the bit stream converter according to the seventh embodiment.

FIG. 27 illustrates in block form the internal configuration of the system converter 124 that constitutes the bit stream converter 127 according to this embodiment. The parts corresponding to those in Embodiment 5 are identified by the same reference numerals and no description will be repeated. In the case where the video encoding schemes for the contents 125 and 128 are H. 263 and MPEG-4, respectively, the same functional block can be used for the syntax converting part 106 and the error resistance syntax determining part 106. The error resistance syntax determining part 105 selects the error resistance syntax of the video coded bit stream of the contents 128 in accordance with the error rate 123 provided from the outside. The system converter may also be configured to select the error resistance syntax as described previously with reference to FIGS. 22 and 23. Further, it may also be configured to adopt the alternative of selecting or not selecting the error resistance syntax.

It is possible to handle, as a special case, that the contents 125 and 128 are both MPEG-4 video coded bit streams. Let it be assumed here that the MPEG-4 video coded bit stream of the contents 125 has been created offline for storage use and encoded without using any error resistance syntax. In this case, since both the input and the output are MPEG-4 video coded bit streams, the syntax converting part 106 does not carry out the syntax conversion in terms of the coding scheme, but only adds selected error resistance syntaxes.

In such instance, too, the error resistance syntaxes can selectively be added, and hence contents generated primarily for a different purpose can be sent over a channel of a different quality. Incidentally, the error rate 123 for judging the selection of the error resistance syntax need not always be a signal accurately indicating the channel condition, and its value may also be designated according to a request from the server or user.

As described above, according to this embodiment, since the media server 127 connected to the radio channel B1 is equipped with the system converter 124, even video contents which are intended for storage use and do not much support the error resistance syntax can easily be converted to a error-resistant bit stream when they are sent over the radio channel.

Embodiment 8

Figure 28:
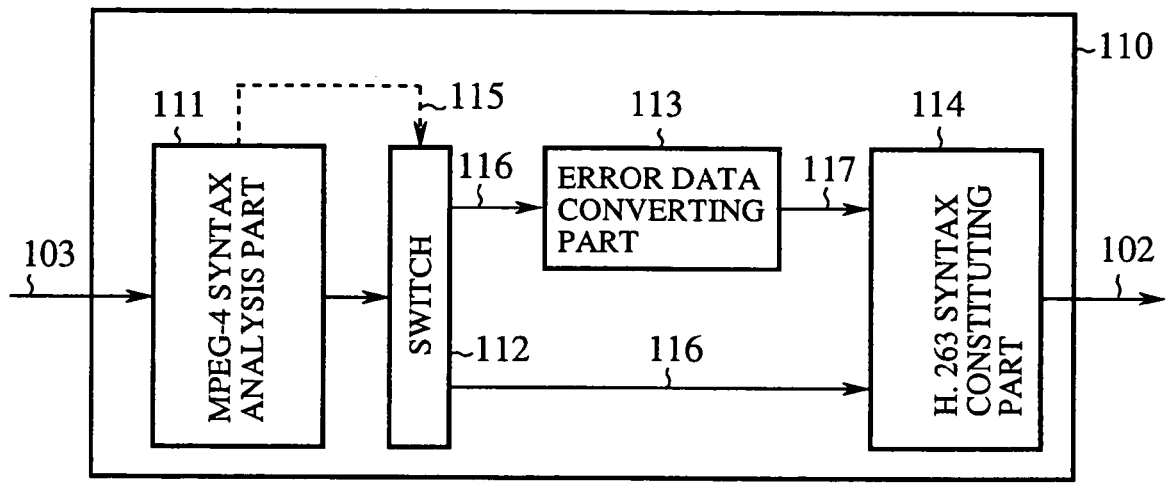
FIG. 28 is a block diagram illustrating the internal configuration of a system converter according to an eighth embodiment of the present invention.

FIG. 28 illustrates in block form the internal configuration of a system converter according to an eighth embodiment (Embodiment 8). The parts corresponding to those in Embodiment 5 are identified by the same reference numerals and no description will be repeated. This embodiment is directed to a system converter 110 which converts MPEG-4 on the radio channel B1 side to H. 263 on the ISDN side in the same system as shown in FIG. 17. In this embodiment the terminal B is the transmitting terminal and the terminal A is the receiving terminal. Reference numeral 111 denotes an MPEG-4 syntax analysis part (syntax analysis means) which: analyzes the input MPEG-4 bit stream 103 according to the MPEG-4 standard; makes a check for a decoding error during analysis; if a decoding error is detected, outputs an error detection signal 115; and separates the MPEG-4 coded bit stream into individual pieces of coded data 116 and outputs them.

Reference numeral 112 denotes a switch which: upon receiving the error detection signal 115 from the MPEG-4 syntax analysis part 111, outputs the input coded data 116 from the analysis part 111 to an error data converting part 113; and when not supplied with the error detection signal 115, provides the coded data 116 to an MPEG-4 syntax constituting part 114. Reference numeral 113 denotes an error data converting part in which a normally unanalyzable bit stream portion of the input coded data 116 is converted, with a minimum deterioration of picture quality, to a substitute value which does not cause an analysis error on the H. 263 syntax after being converted. Reference numeral 114 denotes an H. 263 syntax constituting part (coded data converting means) in which the coded data 117 provided from the error data converting part 113 or the coded data 116 provided via the switch 112 from the MPEG-4 syntax analysis part 111 is reconstructed as the H. 263 coded bit stream 102.

Next, the operation of this embodiment will be described below.

Figure 29:
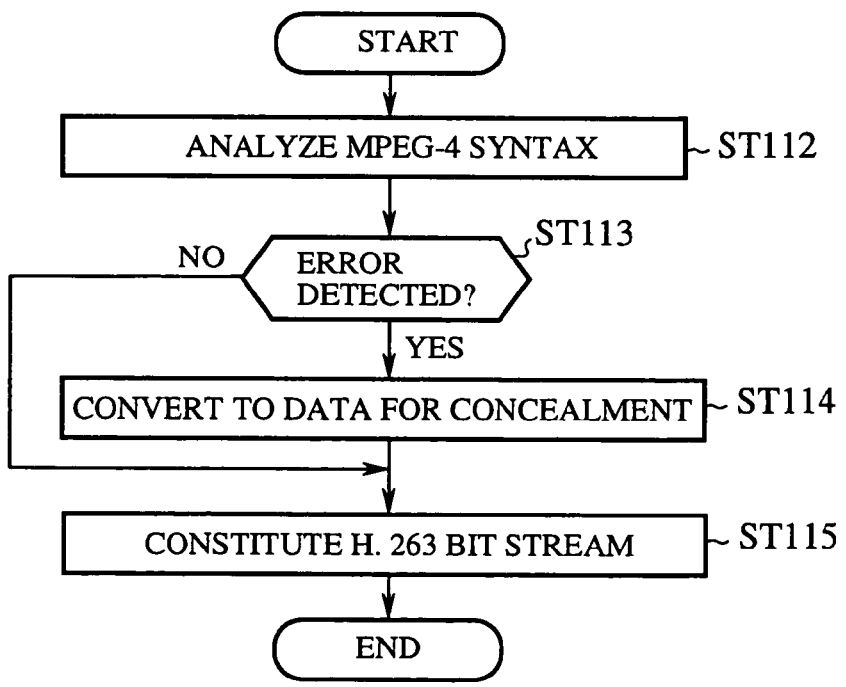
FIG. 29 is a flowchart showing the operation procedure of a bit stream converter according to the eighth embodiment.

FIG. 29 is a flowchart showing the operation procedure of the bit stream converter according to this embodiment.

In the first place, the system converter 110 analyzes the input MPEG-4 coded bit stream 103 according to the MPEG-4 standard (step ST112), and makes a check for a decoding error in the process of analysis (step ST113). In the case of "YES," that is, when a decoding error is detected, the system converter 110 outputs the error detection signal, and at the same time separates the MPEG-4 coded bit stream 103 to individual pieces of coded data 116 and outputs them. On the other hand, in the case of "NO" in step ST113, that is, when no decoding error is detected, the system converter 110 goes to step ST115.

Then, the error data converting part 113 converts a normally unanalyzable bit stream portion of the input coded data 116, with a minimum deterioration of picture quality, to an alternate value (data for concealment) which does not cause an analysis error on the H. 263 syntax after being converted (step ST114). The alternate value thus obtained is provided to the H. 263 syntax constituting part 114. In the H. 263 syntax constituting part 114, the coded data 117 from the error data converting part 113, or the coded data 116 provided via the switch 112 from the MPEG-4 syntax analysis part 111 is reconstructed as the H. 263 coded bit stream (step ST115).

Now, a description will be given of a method of converting the normally unanalyzable bit stream portion, while keeping the deterioration of the picture quality to a minimum, to an alternate value that does not cause an analysis error on the H. 263 syntax.

For example, consider the case where an error occurs in the DSCT coefficient area of a seventh one of ten macro blocks contained in a certain MPEG-4 video packet. Let it be assumed, however, that decoding is restored normal in the next video packet. In this instance, all the pieces of data from the DCT coefficient area of the seventh macro block to eighth, ninth and tenth macro blocks of the said certain video packet cannot be decoded normally.

Accordingly, it is unknown what value should be used for conversion to the H. 263 syntax; for the MPEG-4 coded bit stream area impossible of normal decoding, the system converter 110 of this embodiment sets an alternate value which will minimize the deterioration of picture quality, and uses it as analysis data for conversion to the H. 263 syntax.

As for such an alternate value, if there is the possibility of the unanalyzable macro blocks being subjected to inter-frame motion compensation predictive coding, the value of the motion vector is set to zero and the values of the DCT coefficients are also set to zeroes. It is already known whether the VOP containing the current macro blocks has been coded by the inter-frame motion compensation predictive coding, since the VOP header has already been analyzed.

This is a situation in which the reference image to be used by the VOP for prediction is stored in a frame memory. In the case where no motion is made between VOPs by setting the motion vector to zero, a sufficiently reliable predictive image can be obtained, and by setting the DCT coefficients to zeroes, it is possible to reconstruct the predictive image intact as the H. 263 coded bit stream without containing therein extra prediction residual components. Further, in the analysis of the syntax using the MPEG-4 data partitioning scheme, when an error is detected after the unique word shown in FIG. 21, it is possible to choose a procedure by which the motion vector data analyzed before the unique word is used intact and only the DCT coefficients are set to zeroes.

In this case, if the motion vector analyzed before the unique word is reliable data, a highly reliable predictive image can be obtained with an extremely high degree of accuracy and it can be reconstructed as the H. 263 coded bit stream. Incidentally, by setting the DCT coefficients to zeroes, the prediction residual components are ignored. In a coded bit stream encoded at a low bit rate, however, since the dynamic rage of the DCT coefficients is inherently so narrow that they tend to be distributed in the neighborhood of zero, the decoded image can sufficiently be approximated only with the predictive image in many cases.

As described above, according to this embodiment, even if a bit error gets mixed in the MPEG-4 coded bit stream that is sent over the radio channel, it is possible to achieve the conversion to the H. 263 syntax while keeping the influence of the error to a minimum. Accordingly, stable decoding can be done even in the case where the channel quality is high and an H. 263 decoder of low resistance to errors is used.

Incidentally, in this embodiment the 320 terminal is used as the terminal A, but since the system converter according to this embodiment performs conversion of the moving image coded bit stream, it produces the same effects as described above even when the terminal A is an H. 324 terminal assumed to be connected to an ordinary analog public network or ISDN circuit based on H. 263, or an H. 323 terminal assumed to be connected to the Internet. This embodiment is particularly effective in implementing moving picture communications between the communication terminal connected to the radio channel which supports the MPEG-4 video and the communication terminal connected to the ISDN or existing public network which supports the ITU-T H. 263 video.

Embodiment 9

Figure 30:
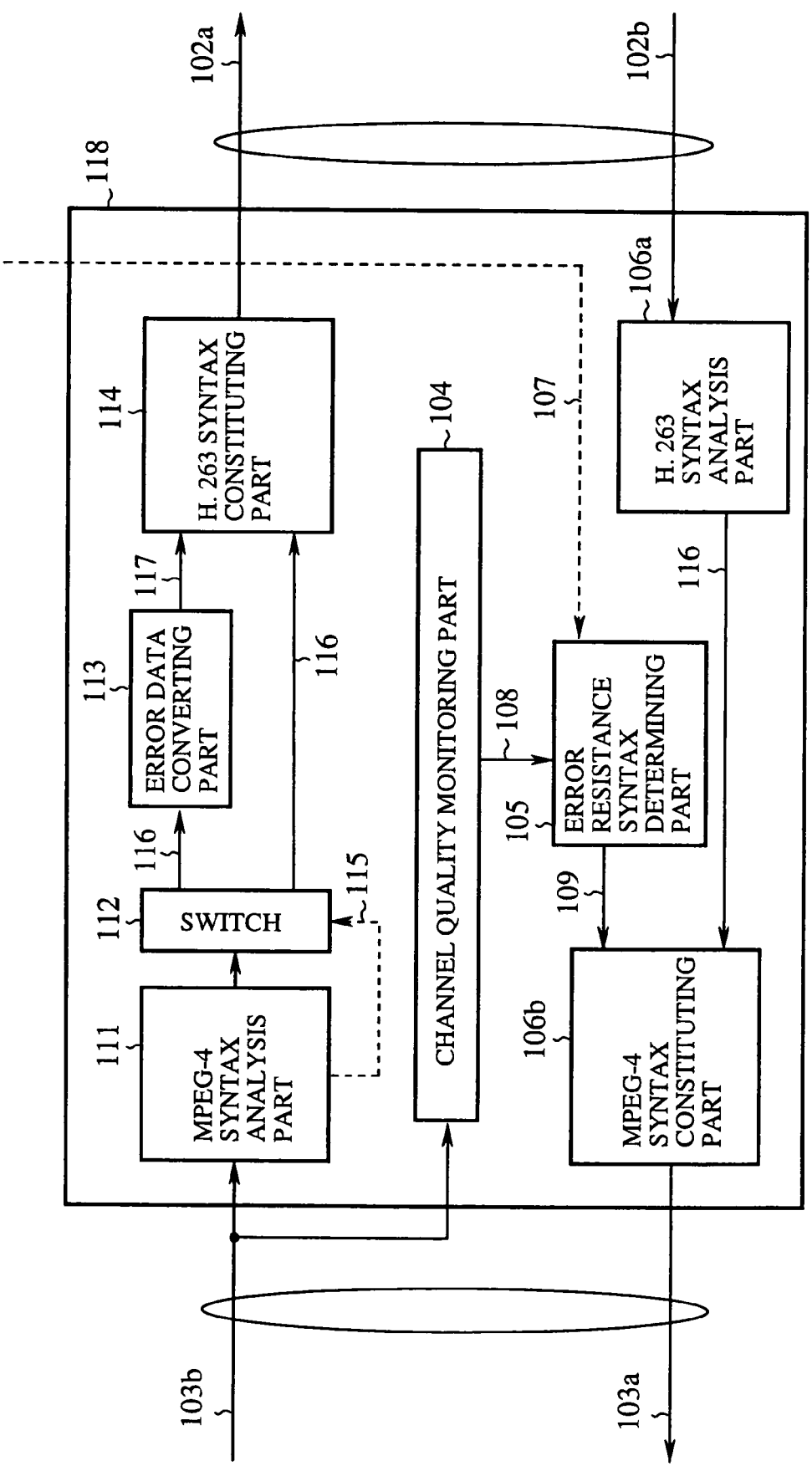
FIG. 30 is a block diagram illustrating the internal configuration of a system converter in a bit stream converter according to a ninth embodiment of the present invention.

FIG. 30 illustrates in block form the internal configuration of system converter of a bit stream converting device according to a ninth embodiment (Embodiment 9) of the present invention. Reference numeral 111 denotes an MPEG-4 syntax analysis part which: analyzes the input down-link MPEG-4 bit stream 103 according to the MPEG-4 standard; makes a check for a decoding error during analysis; if a decoding error is detected, outputs an error detection signal 115; and separates the down-link MPEG-4 coded bit stream into individual pieces of coded data 116 and outputs them.

Reference numeral 112 denotes a switch which: upon receiving the error detection signal 115 from the MPEG-4 syntax analysis part 111, outputs the input coded data 116 from the analysis part 111 to an error data converting part 113;

and when not supplied with the error detection signal 115, provides the coded data 116 to an MPEG-4 syntax constituting part 114. Reference numeral 113 denotes an error data converting part in which a normally unanalyzable bit stream portion of the input coded data 116 is converted, with a minimum deterioration of picture quality, to a substitute value which does not cause an analysis error on the H. 263 syntax after being converted. Reference numeral 114 denotes an H. 263 syntax constituting part in which the coded data 117 provided from the error data converting part 113 or the coded data 116 provided via the switch 112 from the MPEG-4 syntax analysis part 111 is reconstructed to the up-link H. 263 coded bit stream 102a.

Reference numeral 104 denotes a channel quality monitoring part which: receives and demultiplexes the down-link MPEG-4 coded bit stream 103b into media multiplexing packets (AL-PDU) to be converted; makes a check to see if bit errors are contained in a CRC field added to each packet; counts the number of bit errors; calculates an average error rate at predetermine time intervals based on the error count value; and outputs it as an internal signal 108 to an error resistance syntax determining part 105.

Reference numeral 105 denotes an error resistance syntax determining part, which: receives from the channel quality monitoring part 104 the internal signal 108 indicating the error rate; selects, in accordance with the error rate, MPEG-4 error resistance syntaxes one by one or in combination of them; reads therein from an external device an error resistance syntax changing period 107 which determines the timing for changing the error resistance syntax according to the channel condition; and, based on the error resistance syntax changing period 107, outputs the error resistance syntax selection result 109 to a syntax converting part 106b.

Reference numeral 106a denotes an H. 263 syntax analysis part (syntax analysis means) which analyzes the input down-link H. 263 coded bit stream 102b according to the H. 263 standard and separates the down-link coded bit stream 102b into individual pieces of coded data 116. Reference numeral 106b denotes an MPEG-4 syntax constituting part (coded data converting mean), which, when supplied with the error resistance selection result 109 from the error resistance syntax determining part 105, converts the coded data 116 from the H. 263 syntax analysis part 106a to the up-link MPEG-4 coded bit stream 103a.

Next, the operation of this embodiment will be described below.

A description will be given first of the procedure for converting the MPEG-4 coded bit stream to the H. 263 coded bit stream.

The MPEG-4 syntax analysis part 111 receives the down-link MPEG-4 coded bit stream 103b, then analyzes it according to the MPEG-4 standard, and makes a check to see if whether a decoding error is detected. If a decoding error is detected, the analysis part 111 outputs the error detection signal 115 and separates the down-link MPEG-4 coded bit stream 103b into individual pieces of coded data 116.

Upon receiving the error detection signal 115 from the MPEG-4 syntax analysis part 111, the switch 112 provides the coded data 116 also fed from the MPEG-4 syntax analysis part 111 to the error data converting part 111. In the absence of the error detection signal 115, the switch 115 provides the coded data 116 to the H. 263 syntax constituting part 114. Then, the error data converting part 113 converts a normally unanalyzable bit stream portion of the input coded data 116, with a minimum deterioration of picture quality, to an alternate value which does not cause an analysis error on the H. 263 syntax after being converted. And, in the H. 263 syntax constituting part 114, the coded data 117 from the error data converting part 113, or the coded data 116 provided via the switch 112 from the MPEG-4 syntax analysis part 111 is reconstructed as the up-link H. 263 coded bit stream 102a.

Next, a description will be given of the procedure for converting the H. 263 coded bit stream to the MPEG-4 coded bit stream.

The channel quality monitoring part 104: receives and demultiplexes the down-link MPEG-4 coded bit stream 103b into media multiplexing packets (AL-PDU) to be converted; makes a check to see if bit errors are contained in the CRC field added to each packet; counts the number of bit errors; calculates an average error rate at predetermine time intervals based on the error count value; and outputs it as the internal signal 108 to the error resistance syntax determining part 105.

Then, error resistance syntax determining part 105: receives from the channel quality monitoring part 104 the internal signal 108 indicating the error rate; selects, in accordance with the error rate, MPEG-4 error resistance syntaxes one by one or in combination of them; reads therein from an external device the error resistance syntax changing period 107 which determines the timing for changing the error resistance syntax according to the channel condition; and, based on the error resistance syntax changing period 107, outputs the error resistance syntax selection result 109 to the syntax converting part 106b.

And, the H. 263 syntax analysis part (syntax analysis means) 106a analyzes the input down-link H. 263 coded bit stream 102b according to the H. 263 standard and separates the down-link coded bit stream 102b into individual pieces of coded data 116. Next, when supplied with the error resistance selection result 109 from the error resistance syntax determining part 105, the MPEG-4 syntax constituting part 106b converts the coded data 116 from the H. 263 syntax analysis part 106a to the up-link MPEG-4 coded bit stream 103a.

As described above, according to this embodiment, conversions concerning the error resistance syntax can efficiently made, in accordance with the error rate of the channel connected, between terminals of a two-way moving picture communication which support MPEG-4 or H. 263, such as visual telephone or teleconference. This embodiment is particularly effective in implementing moving picture communications between the communication terminal connected to the radio channel which supports the MPEG-4 video and the communication terminal connected to the ISDN or existing public network which supports the ITU-TH.263 video.

Embodiment 10

Figure 31:
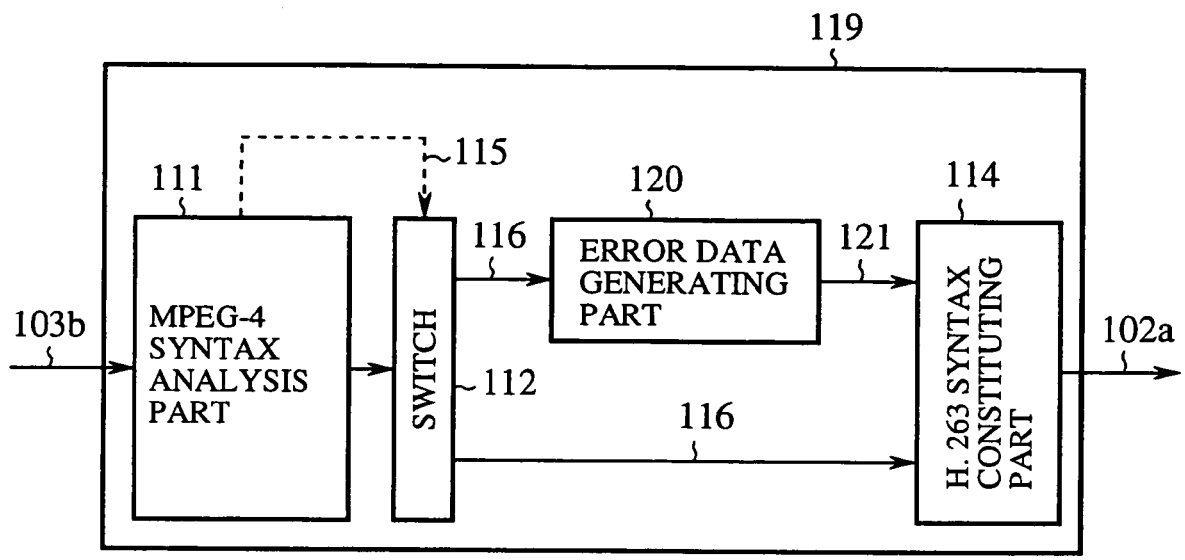
FIG. 31 is a block diagram illustrating a system converter of a bit stream converter according to a tenth embodiment of the present invention.

FIG. 31 illustrates in block form a system converter of a bit stream converting device according to tenth embodiment (Embodiment 10) of the present invention. The parts corresponding to those in Embodiments 5 and 6 are identified by the same references and no description will be repeated. This embodiment is directed to a system converter 119 which converts MPEG-4 at the radio channel side to H. 283 at the ISDN side. In this case, the terminal B is the transmitting terminal and the terminal A is the receiving terminal in FIG. 17.

Reference numeral 120 denotes an error data generating part. For a normally unanalyzable bit stream area of the coded data 116 input thereto via the switch 112, the error data generating part 120 intentionally generates H. 263 data 121 containing an error so that data at the position of that area or in its vicinity is similarly detected as a decoding error at the terminal which receives the converted H. 263 bit stream.

Now, a description will be given of a concrete method for generating the data 121 in the error data generating part 120.

For example, consider the case where an error occurs in the DSCT coefficient area of a seventh one of 10 macro blocks contained in a certain MPEG-4 video packet. Let it be assumed, however, that decoding is restored normal in the next video packet. In this instance, all the pieces of data from the DCT coefficient area of the seventh macro block to eighth, ninth and tenth macro blocks of the said certain video packet cannot be decoded normally. Accordingly, it is unknown what value should be used for conversion to the H. 263 syntax.

For such an MPEG-4 coded bit stream area impossible of normal decoding, the system converting device 119 of this embodiment intentionally generates H. 263 data containing an error so that data at the position of that area or in its vicinity is similarly detected as a decoding error at the terminal which receives the converted H. 263 bit stream.

In the case where the DCT coefficient area is unanalyzable, the error data generating part 120 intentionally generates a code word that is not contained in a VLC table of DCT coefficients for H. 263, or a code word which contains 64 or more DCT coefficients (Since the discrete cosine transform is usually performed for each block composed of 8 by 8 pixels, decoding of 64 or more pieces of coefficient data is actually impossible under normal decoding condition.) and such a code word is provided to an H. 263 syntax constituting part 114.

Alternatively, when an error is detected in the motion vector area, the error data generating part 120 intentionally generates a motion vector that lies offscreen, or a code word that is not contained in the VLC table of DC1 coefficients for H. 263, and provides it to the H. 263 syntax constituting part 114.

Next, the operation of this embodiment will be described below.

Figure 32:
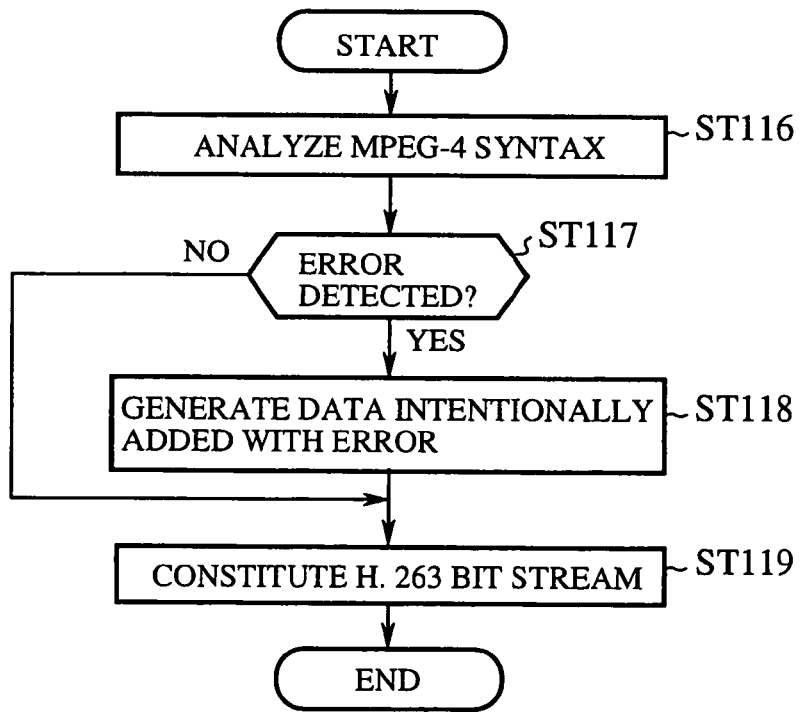
FIG. 32 is a flowchart showing the operation procedure of the bit stream converter according to the tenth embodiment.

FIG. 32 is a flowchart for explaining the operation procedure of the bit stream converter according to this embodiment.

In the first place, the system converter 119 analyzes the input MPEG-4 coded bit stream 103 in the MPEG-4 syntax analysis part 111 according to the MPEG-4 standard (step ST116), and makes a check for a decoding error in the process of analysis (step ST117). In the case of "YES," that is, when a decoding error is detected, the system converter 110 outputs the error detection signal 115, and at the same time separates the MPEG-4 coded bit stream 103 to individual pieces of coded data 116 and outputs them. On the other hand, in the case of "NO" in step ST117, that is, when no decoding error is detected, the system converter 110 goes to step ST119.

Then, for the normally unanalyzable bit stream are of the coded data 116 input via the switch 112, the error data generating part 120 intentionally generates and outputs the H. 263 data 121 containing an error so that data in the unanalyzable bit stream area or in its vicinity is similarly detected as a decoding error at the terminal receiving the converted H. 263 bit stream (step ST118). Then, the H. 263 syntax constituting part 114 reconstructs and output, as the H. 263 coded bit stream 102, the data 121 from the error data generating part 120 or the coded data 116 provided via the switch 112 from the MPEG-4 syntax analysis part (step ST119). As described above, according to this embodiment, even if a bit error gets mixed in the MPEG-4 coded bit stream that is sent over the radio channel, it is possible to perform the syntax conversion to H. 263 while keeping the error condition unchanged. Accordingly, this embodiment eliminates the necessity of taking measures for the system converter 119 itself against errors, permits simplification of the device configuration and ensures maintaining the picture quality according to measures taken at the receiving side against errors.

Furthermore, high picture quality can be obtained at a receiving terminal with a high error resistance syntax, that is, at each receiving terminal the picture quality can be obtained corresponding to the error resistance syntax used.

The system converter 119 of this embodiment is also applicable to the conversion of the H. 283 bit stream to the MPEG-4 one. In this instance, the system converter 119 employs an H. 263 syntax analysis part and an MPEG-4 syntax constituting part in place of the MPEG-4 syntax analysis part 111 and the H. 263 syntax constituting part 114, respectively. As regards an error detected in the H. 263 syntax analysis part 111, the error data generating part 120 intentionally generates data so that the MPEG-4 receiving terminal detects an error at the same position as the above error detection or in its vicinity. The operation procedure is similar to that depicted in FIG. 32.

This embodiment uses the H. 320 terminal as the terminal A, but since the system converter 119 performs conversion for the moving image coded bit stream, it produces the same effects as described above even when the terminal A is an H. 324 terminal assumed to be connected to an ordinary analog public network or ISDN circuit using H. 263, or an H. 323 terminal assumed to be connected to the Internet. This embodiment is particularly effective in implementing moving picture communications between the communication terminal connected to the radio channel which supports the MPEG-4 video and the communication terminal connected to the ISDN or existing public network which supports the ITU-TH.263 video.

EFFECT OF THE INVENTION

As described above, the video packet generating method, the video decoding method, the media multiplexer, the media demultiplexer, the multimedia communication system and the bit stream converter according to the present invention are suitable for use in a system which adds an error detecting codes to each packetized information area, performs error detection and concealment at the receiving side, and effectively converts the error resistance syntax according to the channel condition to provide increased error resistance for moving picture communications.

What is claimed is:

1. A receiving apparatus comprising:
    a media demultiplexer, for demultiplexing a multiplex stream generated by a media multiplexer into packets of coded video streams and packets of coded audio and data streams;
    an error detector for decoding an error detecting code contained in each of said packets to obtain an error detection result; and
    a video decoder for decoding packets of coded video streams into video packets based on said error detection result for each coded video stream concerned,
    wherein each of said coded video streams is composed of plural pieces of compressed block coded data, said plural pieces of compressed block coded data are composed of plural kinds of data elements, said data elements of the same kind are arranged in succession over plural blocks, and said coded video stream is divided, at the point of change in the kind of said data elements arranged in succession, into said each packet, said each packet being added, for each of said divided video coded streams, with an error detecting code for obtaining said error detection result, wherein said plural kinds of data elements include motion vector data and texture information, such that motion vector data is provided in separate packets than texture information in each of said coded video streams, wherein said video decoder determines a position of a decoding error based on the error detection result and selectively performs error concealment based on the position of the decoding error.

2. A receiving apparatus comprising:

a media demultiplexer for demultiplexing a multiplex stream generated by a media multiplexer into packets of coded video streams and packets of coded audio and data streams;

an error detector for detecting an error detecting code contained in each of said packets to obtain an error detection result; and a video decoder for decoding packets of coded video streams into video packets based on said error detection result for each coded video stream concerned, wherein each of said coded video streams is composed of plural pieces of compressed block coded data, said plural pieces of compressed block coded data are composed of plural kinds of data elements, said data elements of the same kind are arranged in succession over plural blocks, and said coded video stream is divided, at the point of change in the kind of said data elements arranged in succession, into said each packet, said each packet being added, for each of said divided video coded streams, with an error detecting code for obtaining said error detection result, wherein said plural kinds of data elements contain a data stream composed of motion vectors contained in plural blocks and a data stream composed of pieces of texture information contained in plural blocks, wherein, based on said error detection result received together with each data stream and the position of said decoding error detected in the decoding of said each data stream, said video decoder decides whether to perform error concealment using decoded motion vectors or abandon said motion vectors and said texture data and perform error concealment.

3. A receiving apparatus comprising:

a media demultiplexer for demultiplexing a multiplex stream generated by a media multiplexer into packets of coded video streams and packets of coded audio and data streams;

an error detector for detecting an error detecting code contained in each of said packets to obtain an error detection result; and a video decoder for decoding packets of coded video streams into video packets based on said error detection result for each coded video stream concerned, wherein each of said coded video streams is composed of plural pieces of compressed block coded data, and for each of said compressed block coded data of plural blocks, header information is coded which contains a unique code indicating the head of said each block coded data and its block number, and said coded video stream is divided into packets at the point of change between said header information and said block coded data, said packets being added, for each of said plural video segments, with an error detecting code for obtaining said error detection result, wherein, upon detecting a decoding error during decoding of said coded video stream received for each packet, said video decoder decides a position of resynchronization based on said unique code and said error detection result received together with coded data of said header information and resynchronization is performed from the bit position of error detection to a unique code indicating the beginning of the next block coded data.

4. A receiving apparatus comprising:

a media demultiplexer for demultiplexing a multiplex stream generated by a media multiplexer into packets of coded video streams and packets of coded audio and data streams;

an error detector for detecting an error detecting code contained in each of said packets to obtain an error detection result; and a video decoder for decoding packets of coded video streams into video packets based on said error detection result for each coded video stream concerned, wherein each of said coded video streams is composed of compressed block coded data, and for each block coded data of plural blocks, header information is coded which contains a unique code indicating the head of said each block coded data and its block number, wherein said coded video stream is divided into packets at the point of change between said header information and said compressed block coded data, said packets being added with said error detecting code for each of said plural video segments, wherein said video decoder determines a position of a decoding error based on the error detection result and selectively performs error concealment based on the position of the decoding error.

5. A receiving apparatus comprising:

a media demultiplexer for demultiplexing a multiplex stream generated by a media multiplexer into packets of coded video streams and packets of coded audio and data streams;

an error detector for detecting an error detecting code contained in each of said packets to obtain an error detection result; and a video decoder for decoding packets of coded video streams into video packets based on said error detection result for each coded video stream concerned, wherein each of said coded video streams is composed of plural pieces of compressed block coded data, and for each block coded data of plural blocks, header information is coded which contains a unique code indicating the head of said each block coded data and its block number, said plural pieces of compressed block coded data are composed of plural kinds of data elements, said data elements of the same kind are arranged in succession over plural blocks, and said coded video stream is divided, at the point of change in the kind of said data elements arranged in succession, into said each packet, said each packet being added, for each of said divided video coded streams, with an error detecting code for obtaining said error detection result, wherein said plural kinds of data elements contain a data stream composed of motion vectors contained in plural blocks and a data stream composed of pieces of texture information contained in plural blocks, wherein, based on said error detection result received together with each data stream and the position of said decoding error detected in the decoding of said each data stream, said video decoder decides whether to perform error concealment using decoded motion vectors or abandon said motion vectors and said texture data and perform error concealment.

6. A receiving apparatus comprising:
- a media demultiplexer for demultiplexing a multiplex stream generated by a media multiplexer into packets of coded video streams and packets of coded audio and data streams;
- an error detector for detecting an error detecting code contained in each of said packets to obtain an error detection result; and
- a video decoder for decoding packets of coded video streams into video packets based on said error detection result for each coded video stream concerned,
- wherein each of said coded video streams is composed of plural pieces of compressed block coded data, and for each block coded data of plural blocks, header information is coded which contains a unique code indicating the head of said each block coded data and its block number, said plural pieces of compressed block coded data are composed of plural kinds of data elements, said data elements of the same kind are arranged in succession over plural blocks, and said coded video stream is divided, at the point of change in the kind of said data elements arranged in succession, into said each packet, said each packet being added, for each of said divided video coded streams, with an error detecting code for obtaining said error detection result,
- wherein said plural kinds of data elements include motion vector data and texture information, such that motion vector data is provided in separate packets than texture information in each of said coded video streams,
- wherein, upon detecting a decoding error during decoding of said coded video stream received for each packet, said video decoder decides the position of resynchronization based on said unique code and said error detection result received together with coded data of said header information and resynchronization is performed from the bit position of error detection to a unique code indicating the beginning of the next block coded data.

* * * * *